US008335872B2

(12) United States Patent
Pahuja et al.

(10) Patent No.: US 8,335,872 B2
(45) Date of Patent: Dec. 18, 2012

(54) SYSTEMS AND METHODS FOR FAST SEEK AND SCAN FUNCTIONS IN A DIGITAL RADIO BROADCAST RECEIVER

(75) Inventors: Ashwini Pahuja, Albertson, NY (US); Marek Milbar, Huntingdon Valley, PA (US); David Gorelik, Ridgewood, NJ (US); Catherine P. Gooi, Jersey City, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 933 days.

(21) Appl. No.: 12/318,593

(22) Filed: Dec. 31, 2008

(65) Prior Publication Data

US 2010/0166122 A1 Jul. 1, 2010

(51) Int. Cl.
*G06F 3/00* (2006.01)
*G06F 13/00* (2006.01)

(52) U.S. Cl. ......... 710/36; 710/2; 710/5; 710/8; 710/15; 710/33

(58) Field of Classification Search ........................ None
See application file for complete search history.

(56) References Cited

U.S. PATENT DOCUMENTS

| | | | | |
|---|---|---|---|---|
| 2004/0181799 | A1* | 9/2004 | Lu et al. | 725/18 |
| 2005/0289591 | A1* | 12/2005 | Vermola et al. | 725/45 |
| 2006/0155398 | A1* | 7/2006 | Hoffberg et al. | 700/86 |
| 2006/0209941 | A1 | 9/2006 | Kroeger | |
| 2007/0274420 | A1 | 11/2007 | Billings | |
| 2008/0298440 | A1 | 12/2008 | Kroeger et al. | |

OTHER PUBLICATIONS

National Association of Broadcasters—National Radio Systems Committee, "NRSC-5-A In-band/on-channel Digital Radio Broadcasting Standard", Sep. 2005, pp. 1-36, "http://www.nrscstandards.org."

* cited by examiner

*Primary Examiner* — Scott Sun
(74) *Attorney, Agent, or Firm* — Jones Day

(57) ABSTRACT

Methods and systems for advancing to another service from a plurality of services in a digital radio broadcast receiver are described. The methods and systems include the steps of receiving an instruction to advance to another service from a man-machine interface of the digital radio broadcast receiver, selecting an entry from a set of entries stored in a memory of the digital radio broadcast receiver responsive to the instruction, wherein each entry identifies a service, and wherein at least some of said services correspond to services identified as receivable, tuning to a first service identified by the selected entry, rendering content received on the first service at the digital radio broadcast receiver, and updating the set of entries stored in the memory of the digital radio broadcast receiver based on at least one criteria.

33 Claims, 16 Drawing Sheets

SYSTEMS AND METHODS FOR FAST SEEK AND SCAN FUNCTIONS IN A DIGITAL RADIO BROADCAST RECEIVER

BACKGROUND

1. Field of the Disclosure

The present disclosure relates to digital radio broadcast reception and, in particular, to methods and systems for fast seek and scan tuning of a digital radio broadcast receiver.

2. Background Information

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC digital radio broadcasting signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC digital radio broadcasting technology can provide digital quality audio, superior to existing analog broadcasting formats. Because each IBOC digital radio broadcasting signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or services over one channel in the AM or FM spectrum, enables stations to broadcast multiple services and supplemental programs on any of the sub-channels of the main frequency. For example, multiple data services can include alternative music formats, local traffic, weather, news, and sports. The supplemental services and programs can be accessed in the same manner as the traditional station frequency using tuning or seeking functions. For example, if the analog modulated signal is centered at 94.1 MHz, the same broadcast in IBOC can include supplemental services 94.1-1, 94.1-2, and 94.1-3. Highly specialized supplemental programming can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A and its updates, the disclosure of which are incorporated herein by reference, set forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/SG.asp. iBiquity's HD Radio™ technology is an implementation of the NRSC-5 IBOC standard. Further information regarding HD Radio™ technology can be found at www.hdradio.com and www.ibiquity.com.

Other types of digital radio broadcasting systems include satellite systems such as Satellite Digital Audio Radio Service (SDARS, e.g., XM Radio, Sirius), Digital Audio Radio Service (DARS, e.g., WorldSpace), and terrestrial systems such as Digital Radio Mondiale (DRM), Eureka 147 (branded as DAB Digital Audio Broadcasting), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

Digital radio broadcasting systems provide digital radio on a large number of radio stations throughout the United States. Digital broadcast radio receivers can include seek and scan functions that allow a user of the receiver to search for available signals of interest. The present inventors have observed that typical seek and scan processes may require an unsatisfying amount of time, considering that in the busiest radio markets, up to 120 radio stations may be present in the entire radio band, and potentially many more programs when supplemental services are taken into account. The present inventors have also observed that the conventional processes may require a user to listen to a significant amount of undesired content before reaching desired content.

The present inventors have observed that a typical user tends to listen to only a fraction of the available content due to, for example, the user's preferences, reception capabilities, and personal schedule. Thus the present inventors have observed a need for systems and methods to facilitate rapidly and intelligently seeking for and scanning through the available services, both analog and digital, that can be received by a digital radio broadcast receiver.

SUMMARY

Embodiments of the present disclosure are directed to systems and methods that may satisfy these needs. According to exemplary embodiments, a method of advancing to another service from a plurality of services in a digital radio broadcast receiver is disclosed. The method includes the steps of receiving an instruction to advance to another service from a man-machine interface of the digital radio broadcast receiver, selecting an entry from a set of entries stored in a memory of the digital radio broadcast receiver responsive to the instruction, wherein each entry identifies a service, and wherein at least some of said services correspond to services identified as receivable, tuning to a first service identified by the selected entry, rendering content received on the first service at the digital radio broadcast receiver, and updating the set of entries stored in the memory of the digital radio broadcast receiver based on at least one criteria.

A system comprising a processing system and a memory coupled to the processing system is described wherein the processing system is configured to carry out the above-described method. Computer programming instructions adapted to cause a processing system to carry out the above-described method may be embodied within any suitable article of manufacture such as a computer readable storage medium.

BRIEF DESCRIPTION OF THE DRAWINGS

These and other features, aspects, and advantages of the present disclosure will become better understood with regard to the following description, appended claims, and accompanying drawings wherein:

DESCRIPTION

Digital radio broadcast receivers as described herein can permit users to rapidly seek for and scan through a number of available services by providing a set of entries identifying services that were previously identified as receivable with sufficient signal strength for reception.

Exemplary Digital Radio Broadcasting System

FIGS. 1-10 and the accompanying description herein provide a general description of an exemplary IBOC system, exemplary broadcasting equipment structure and operation, and exemplary receiver structure and operation. FIGS. 11-15 and the accompanying description herein provide a detailed description of exemplary approaches for advancing through a plurality of services in a digital radio broadcast receiver in accordance with exemplary embodiments of the present disclosure. Whereas aspects of the disclosure are presented in the context of an exemplary IBOC system, it should be understood that the present disclosure is not limited to IBOC systems and that the teachings herein are applicable to other forms of digital radio broadcasting as well.

As referred to herein, a service is any analog or digital medium for communicating content via radio frequency broadcast. For example, in an IBOC radio signal, the analog modulated signal, the digital main program service, and the digital supplemental services could all be considered services. Other examples of services can include conditionally accessed programs (CAs), which are programs that require a specific access code and can be both audio and/or data such as, for example, a broadcast of a game, concert, or traffic update service, and data services, such as traffic data, multimedia and other files, and service information guides (SIGs). A service identifier as referred to herein is a reference to a particular service. For example, if an analog modulated signal is centered at 94.1 MHz then a service identifier could refer to the radio frequency of 94.1 MHz. Additionally, the same broadcast in IBOC digital radio broadcasting can include a number of supplemental audio and data services and each could have its own service identifier.

Furthermore, as referred to herein, seek refers to a function that causes a receiver to go to the next receivable service, for example, with the touch of a button. Scan refers to a function that causes the receiver to traverse through available services, stopping at each service for a predetermined time, typically a few seconds, allowing a user to select the current service or let the receiver scan to the next service.

Figure 1:
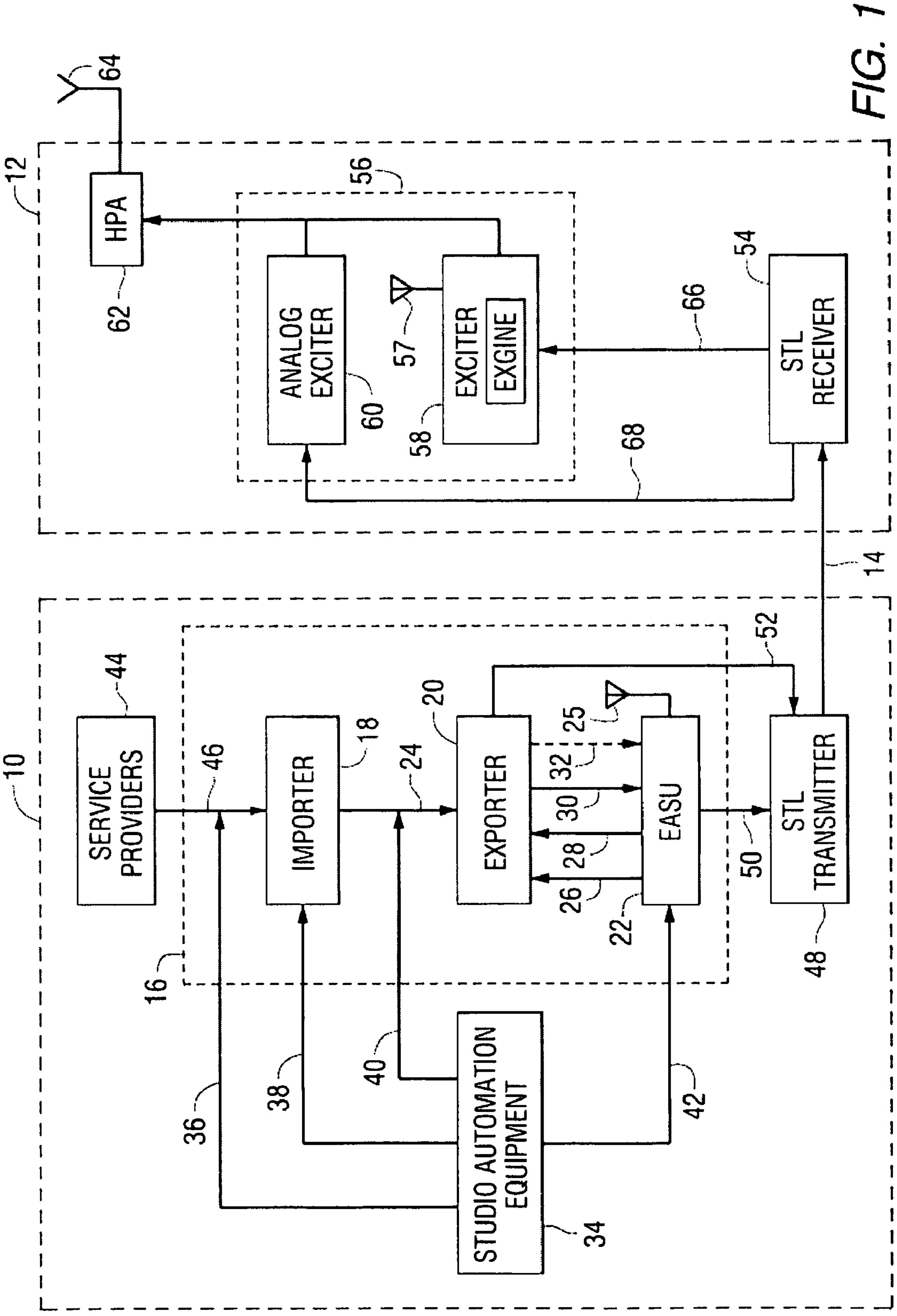
FIG. 1 illustrates a block diagram that provides an overview of a system in accordance with certain embodiments.

Referring to the drawings, FIG. 1 is a functional block diagram of the relevant components of a studio site 10, an FM transmitter site 12, and a studio transmitter link (STL) 14 that can be used to broadcast an FM IBOC digital radio broadcasting signal. The studio site includes, among other things, studio automation equipment 34, an Ensemble Operations Center (EOC) 16 that includes an importer 18, an exporter 20, an exciter auxiliary service unit (EASU) 22. An STL transmitter 48 links the EOC with the transmitter site. The transmitter site includes an STL receiver 54, an exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data or SPS data, also known as program service data (PSD), includes information such as music title, artist, album name, etc. Supplemental program service can include supplementary audio content as well as program service data.

The importer contains hardware and software for supplying advanced application services (AAS). AAS can include any type of data that is not classified as MPS, SPS, or Station Information Service (SIS). SIS provides station information, such as call sign, absolute time, position correlated to GPS, etc. Examples of AAS include a Service Information Guide (SIG), which provides detailed station service information, and data services for electronic program guides, navigation maps, real-time traffic and weather information, multimedia applications, other audio services, and other data content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link. As part of the AAS, the importer also encodes a SIG, in which it typically identifies and describes services. For example, the SIG may include data identifying the genre of the services available on the current frequency (e.g., the genre of MPS audio and any SPS audio).

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC digital radio broadcasting broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter engine (exgine) 56 and an analog exciter 60. The STL receiver 54 receives exciter link data, including audio and data signals as well as command and control messages, over the STL link 14. The exciter link data is passed to the exciter 56, which produces the IBOC digital radio broadcasting waveform. The exciter includes a host processor, digital up-converter, RF up-converter, and exgine subsystem 58. The exgine accepts exciter link data and modulates the digital portion of the IBOC digital radio broadcasting waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, in an AM transmission system, the exciter 56 produces phase and magnitude information and the analog signal is output directly to the high power amplifier.

IBOC digital radio broadcasting signals can be transmitted in both AM and FM radio bands, using a variety of waveforms. The waveforms include an FM hybrid IBOC digital radio broadcasting waveform, an FM all-digital IBOC digital radio broadcasting waveform, an AM hybrid IBOC digital radio broadcasting waveform, and an AM all-digital IBOC digital radio broadcasting waveform.

Figure 2:
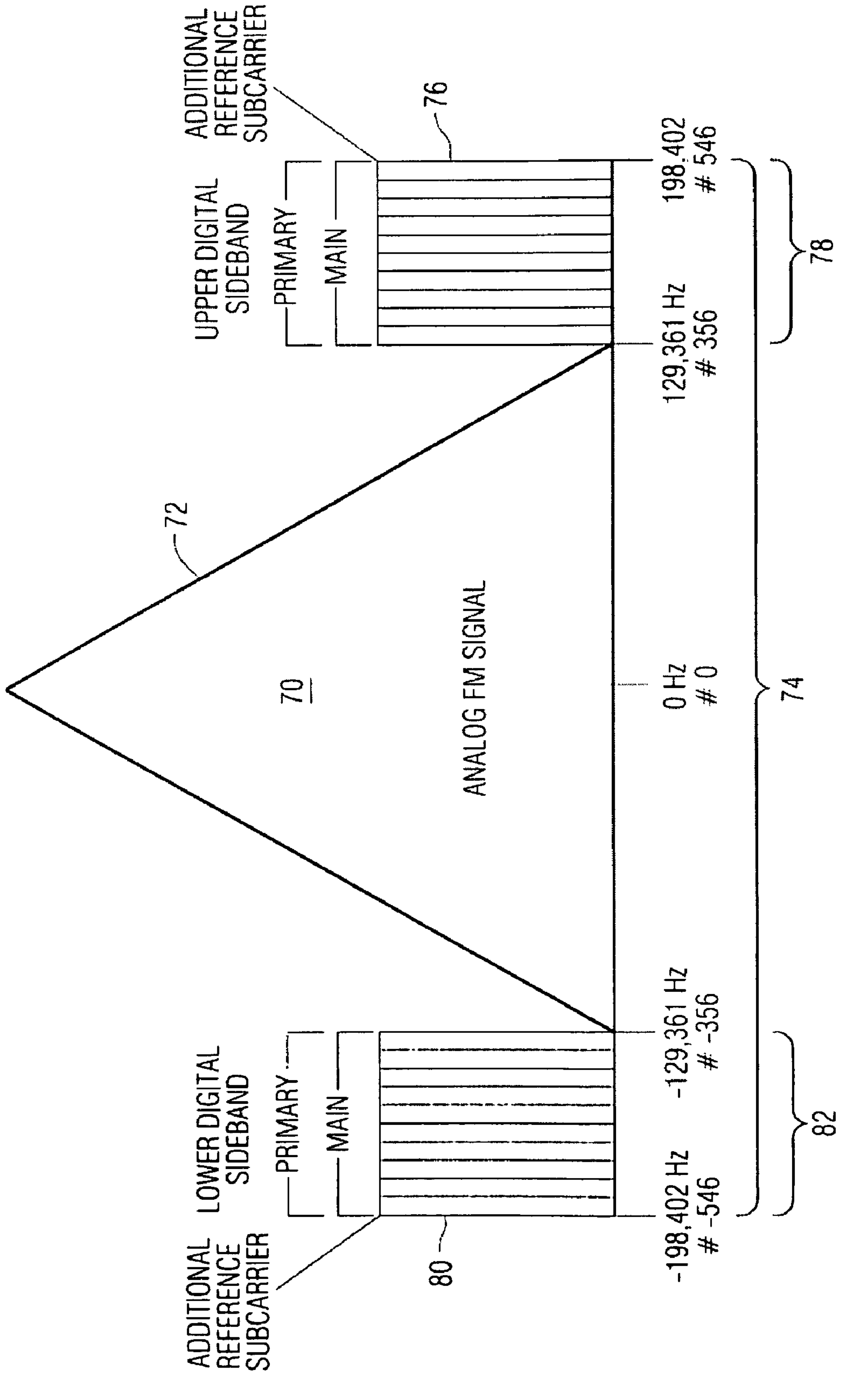
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
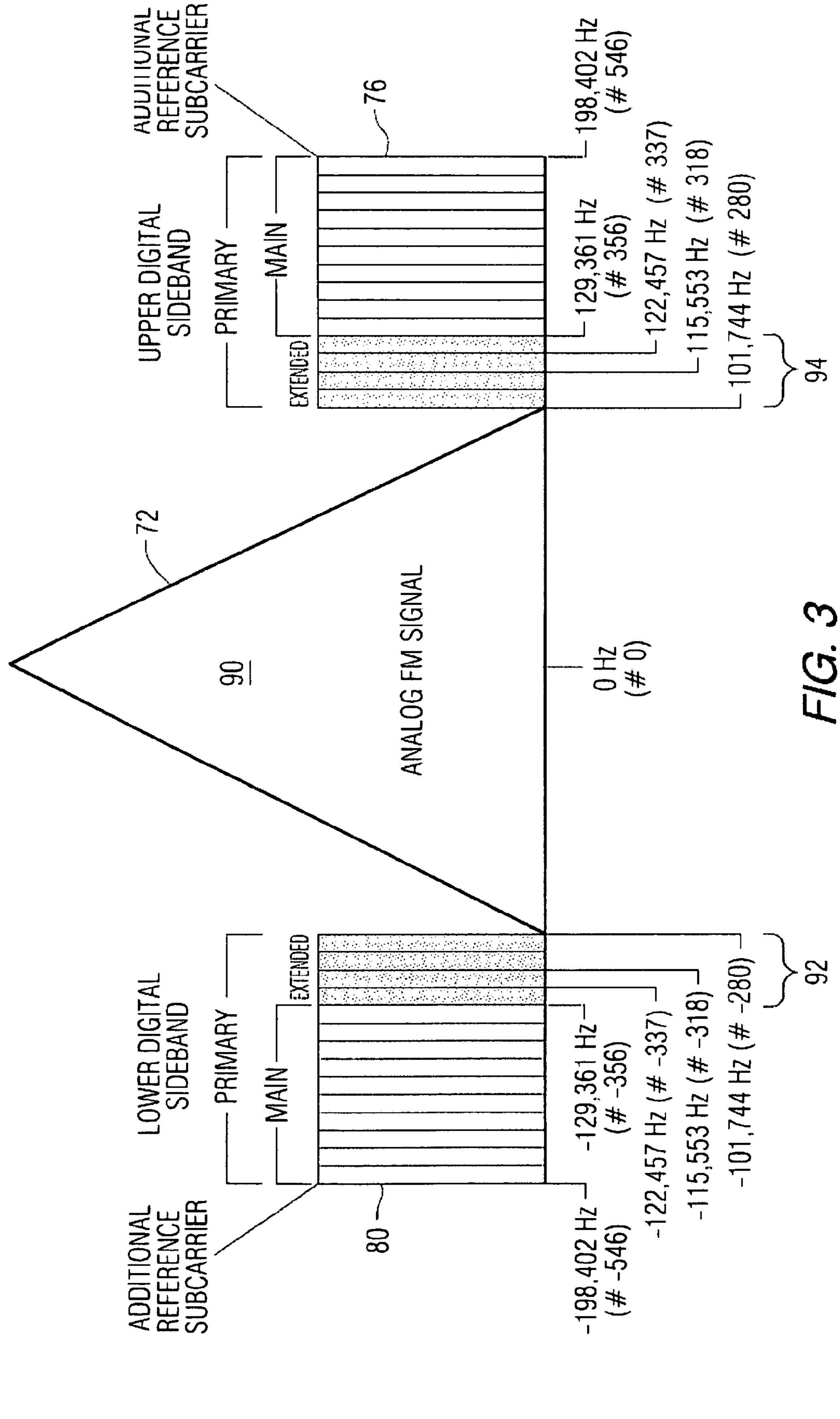
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
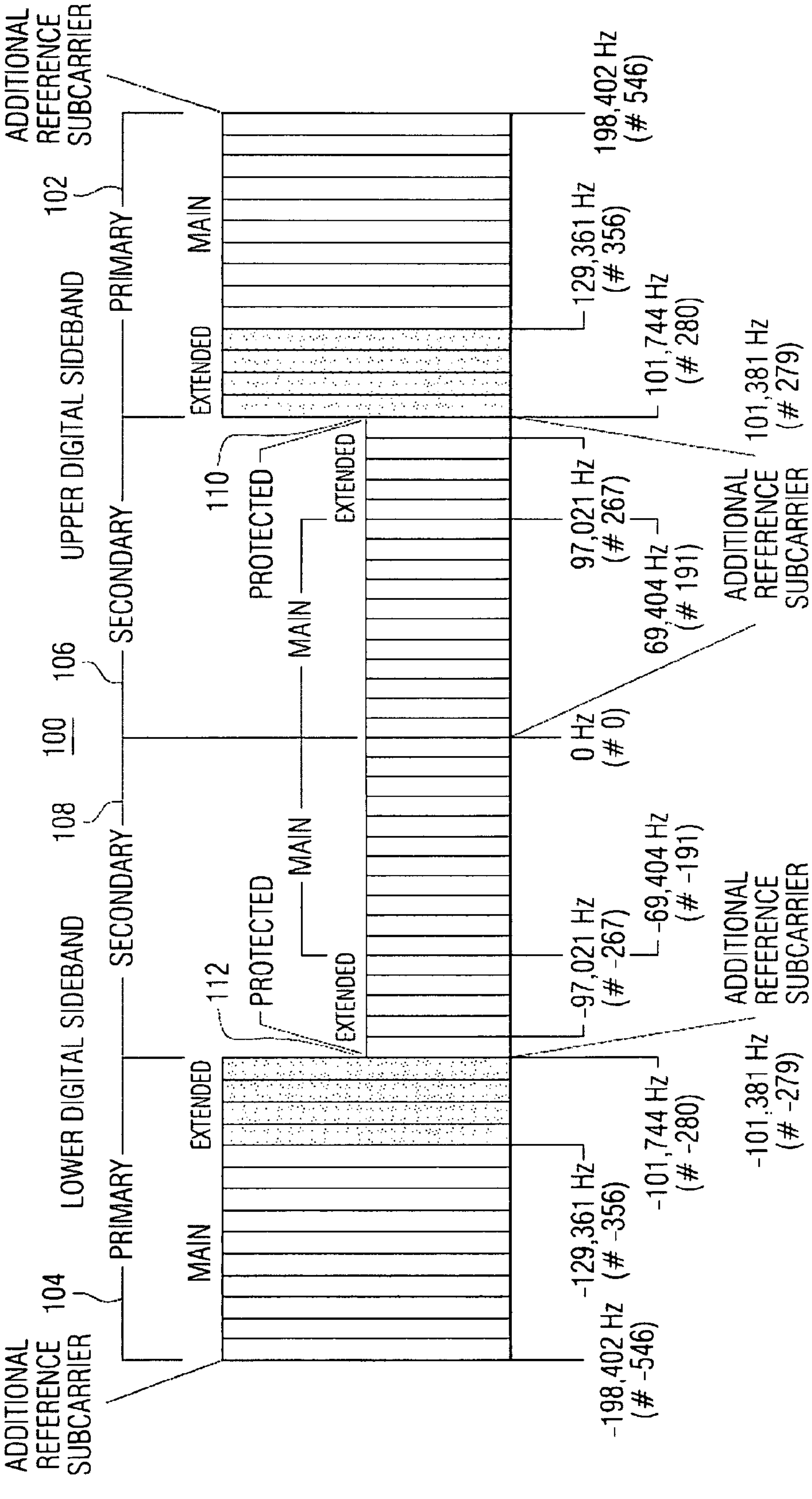
FIG. 4 is a schematic representation of an all-digital FM IBOC waveform.

FIG. 4 is a schematic representation of an all-digital FM IBOC waveform 100. The all-digital waveform is constructed by disabling the analog signal, fully extending the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereophonic, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Figure 5:
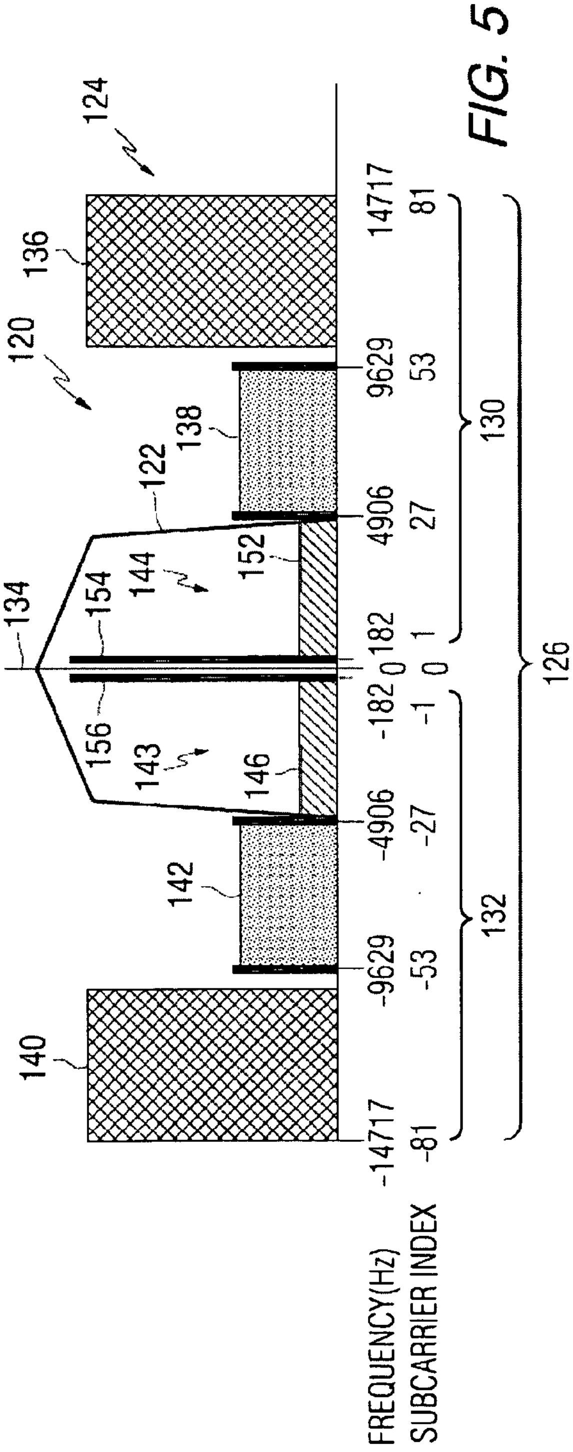
FIG. 5 is a schematic representation of a hybrid AM IBOC waveform.

FIG. 5 is a schematic representation of an AM hybrid IBOC digital radio broadcasting waveform 120. The hybrid format includes the conventional AM analog signal 122 (bandlimited to about ±5 kHz) along with a nearly 30 kHz wide digital radio broadcasting signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC digital radio broadcasting signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. The groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

Figure 6:
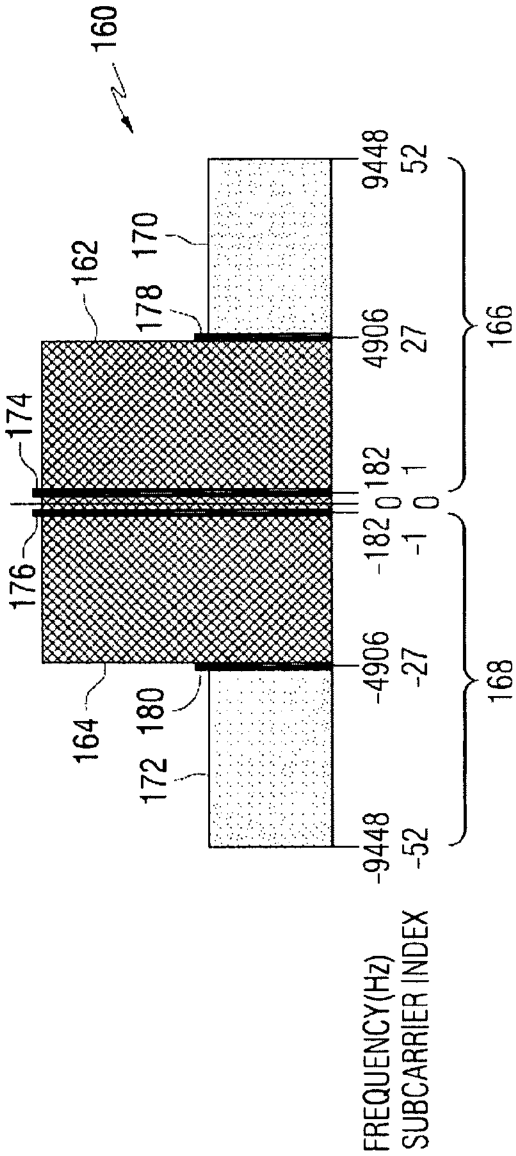
FIG. 6 is a schematic representation of an all-digital AM IBOC waveform.

FIG. 6 is a schematic representation of the subcarrier assignments for an all-digital AM IBOC digital radio broadcasting waveform. The all-digital AM IBOC digital radio broadcasting signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
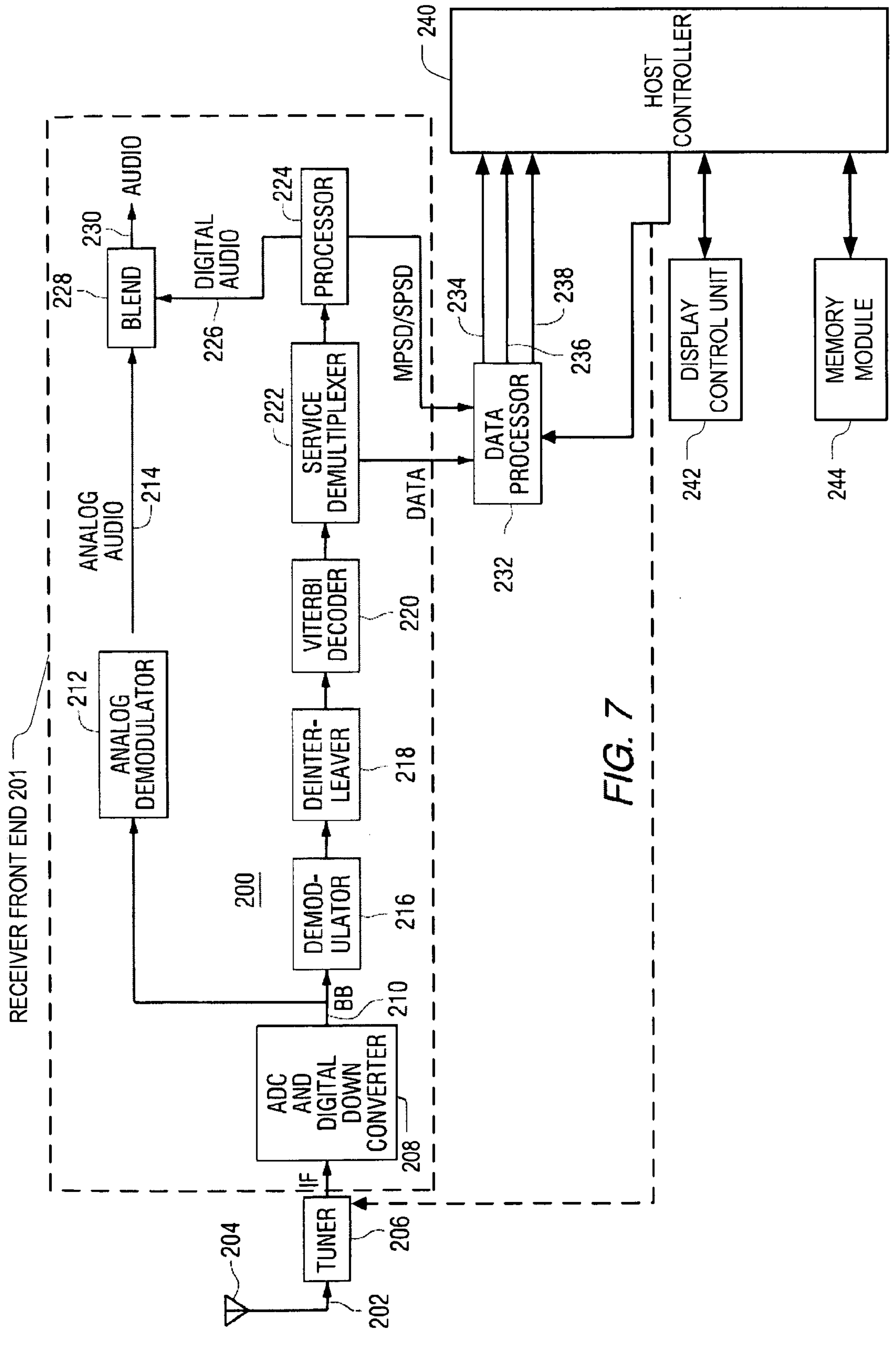
FIG. 7 is a functional block diagram of an AM IBOC digital radio broadcasting receiver in accordance with certain embodiments.

FIG. 7 is a simplified functional block diagram of the relevant components of an AM IBOC digital radio broadcasting receiver 200. While only certain components of the receiver 200 are shown for exemplary purposes, it should be apparent that the receiver may comprise a number of additional components and may be distributed among a number of separate enclosures having tuners and front-ends, speakers, remote controls, various input/output devices, etc. The receiver 200 has a tuner 206 that includes an input 202 connected to an antenna 204. The receiver also includes a front end 201 that includes a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an inter-integrated circuit ($I^2C$), serial peripheral interface (SPI), universal asynchronous receiver/transmitter (UART), or universal serial bus (USB). The data signals can include, for example, SIS, MPS data, SPS data, and one or more AAS.

The host controller 240 receives and processes the data signals (e.g., the SIS, MPSD, SPSD, and AAS signals). The host controller 240 comprises a microcontroller that is coupled to the display control unit (DCU) 242 and memory module 244. Any suitable microcontroller could be used such as an Atmel® AVR 8-bit reduced instruction set computer (RISC) microcontroller, an advanced RISC machine (ARM®) 32-bit microcontroller or any other suitable microcontroller. Additionally, a portion or all of the functions of the host controller 240 could be performed in a baseband processor (e.g., the processor 224 and/or data processor 232). The DCU 242 comprises any suitable I/O processor that controls the display, which may be any suitable visual display such as an LCD or LED display. In certain embodiments, the DCU 242 may also control user input components via touch-screen display. In certain embodiments the host controller 240 may also control user input from a keyboard, dials, knobs or other suitable inputs. The memory module 244 may include any suitable data storage medium such as RAM, Flash ROM (e.g., an SD memory card), and/or a hard disk drive. In certain embodiments, the memory module 244 may be included in an external component that communicates with the host controller 240 such as a remote control.

Figure 8A:
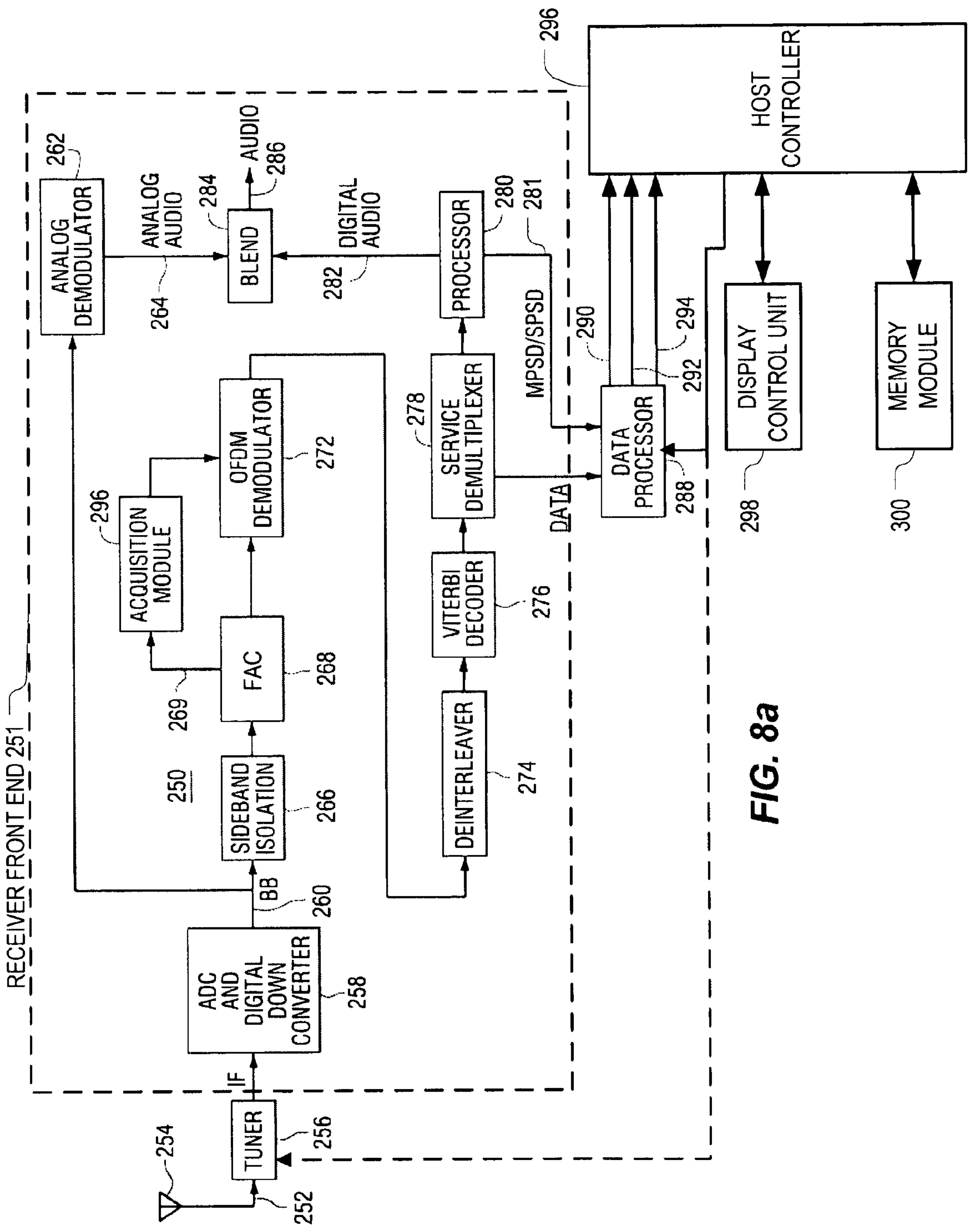
FIG. 8*a* is a functional block diagram of an FM IBOC digital radio broadcasting receiver in accordance with certain embodiments.

FIG. 8*a* is a simplified functional block diagram of the relevant components of an FM IBOC digital radio broadcasting receiver 250. While only certain components of the receiver 250 are shown for exemplary purposes, it should be apparent that the receiver may comprise a number of additional components and may be distributed among a number of separate enclosures having tuners and front-ends, speakers, remote controls, various input/output devices, etc. The exemplary receiver includes a tuner 256 that has an input 252 connected to an antenna 254. The receiver also includes a front end 251. The IF signal from the tuner 256 is provided to an analog-to-digital converter and digital down converter 258 to produce a baseband signal at output 260 comprising a series of complex signal samples. The signal samples are complex in that each sample comprises a "real" component and an "imaginary" component. An analog demodulator 262 demodulates the analog modulated portion of the baseband signal to produce an analog audio signal on line 264. The digitally modulated portion of the sampled baseband signal is next filtered by isolation filter 266, which has a pass-band frequency response comprising the collective set of subcarriers $f_1$-$f_n$ present in the received OFDM signal. First adjacent canceller (FAC) 268 suppresses the effects of a first-adjacent interferer. Complex signal 269 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282 and MPSD/SPSD 281. The analog and main digital audio signals are blended as shown in block 284, or the supplemental program signal is passed through, to produce an audio output on line 286. A data processor 288 processes the data signals and produces data output signals on lines 290, 292 and 294. The data lines 290, 292 and 294 may be multiplexed together onto a suitable bus such as an $I^2C$, SPI, UART, or USB. The data signals can include, for example, SIS, MPS data, SPS data, and one or more AAS.

The host controller 296 receives and processes the data signals (e.g., SIS, MPS data, SPS data, and AAS). The host controller 296 comprises a microcontroller that is coupled to the DCU 298 and memory module 300. Any suitable microcontroller could be used such as an Atmel® AVR 8-bit RISC microcontroller, an advanced RISC machine (ARM®) 32-bit microcontroller or any other suitable microcontroller. Additionally, a portion or all of the functions of the host controller 296 could be performed in a baseband processor (e.g., the processor 280 and/or data processor 288). The DCU 298 comprises any suitable I/O processor that controls the display, which may be any suitable visual display such as an LCD or LED display. In certain embodiments, the DCU 298 may also control user input components via a touch-screen display. In certain embodiments the host controller 296 may also control user input from a keyboard, dials, knobs or other suitable inputs. The memory module 300 may include any suitable data storage medium such as RAM, Flash ROM (e.g., an SD memory card), and/or a hard disk drive. In certain embodiments, the memory module 300 may be included in an external component that communicates with the host controller 296 such as a remote control.

In practice, many of the signal processing functions shown in the receivers of FIGS. 7 and 8*a* can be implemented using one or more integrated circuits. For example, while in FIGS. 7 and 8*a* the signal processing block, host controller, DCU, and memory module are shown as separate components, the functions of two or more of these components could be combined in a single processor (e.g., a System on a Chip (SoC)).

Figure 9A:
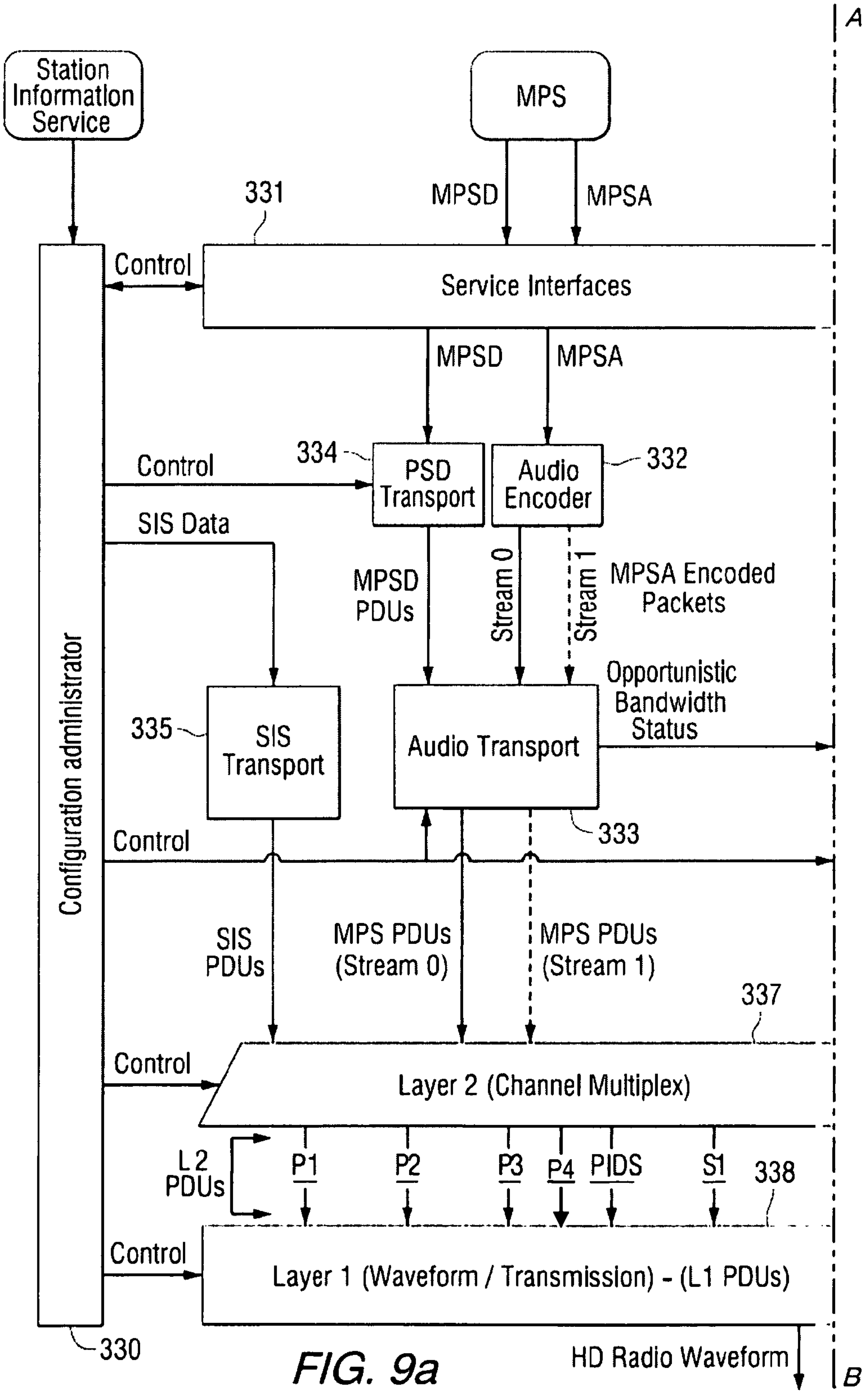
FIGS. 9*a* and 9*b* are diagrams of an IBOC digital radio broadcasting logical protocol stack from the broadcast perspective.
Figure 9B:
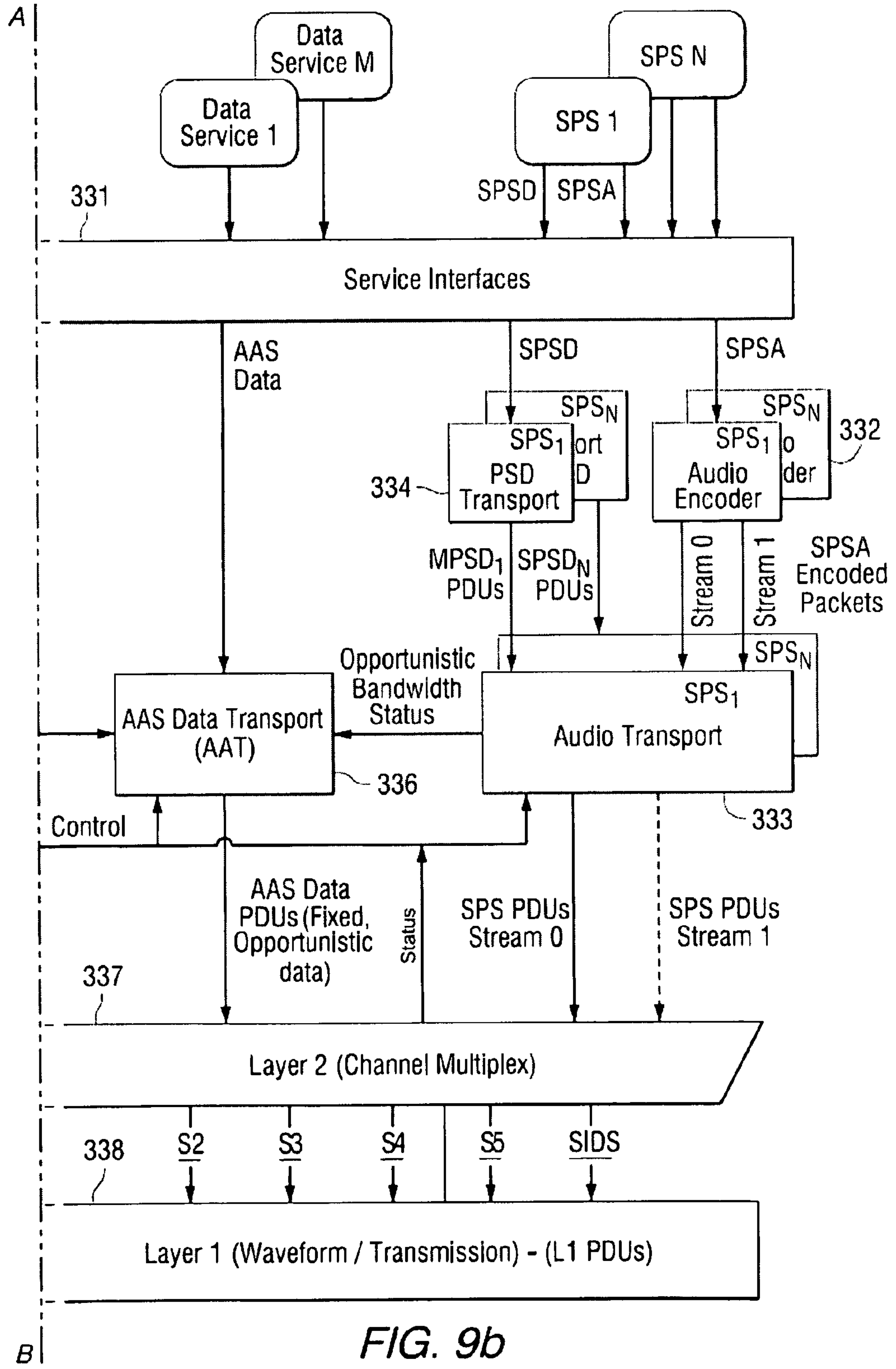

FIGS. 9*a* and 9*b* are diagrams of an IBOC digital radio broadcasting logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9*a* and 9*b*, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio encoder 332 encodes both MPS audio and SPS audio to produce core (Stream 0) and optional enhancement (Stream 1) streams of MPS and SPS audio encoded packets, which are passed to audio transport 333. Audio encoder 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS, as well as other information conveyed by the station. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service, and possibly mapped into a predefined collection of subcarriers. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC digital radio broadcasting waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
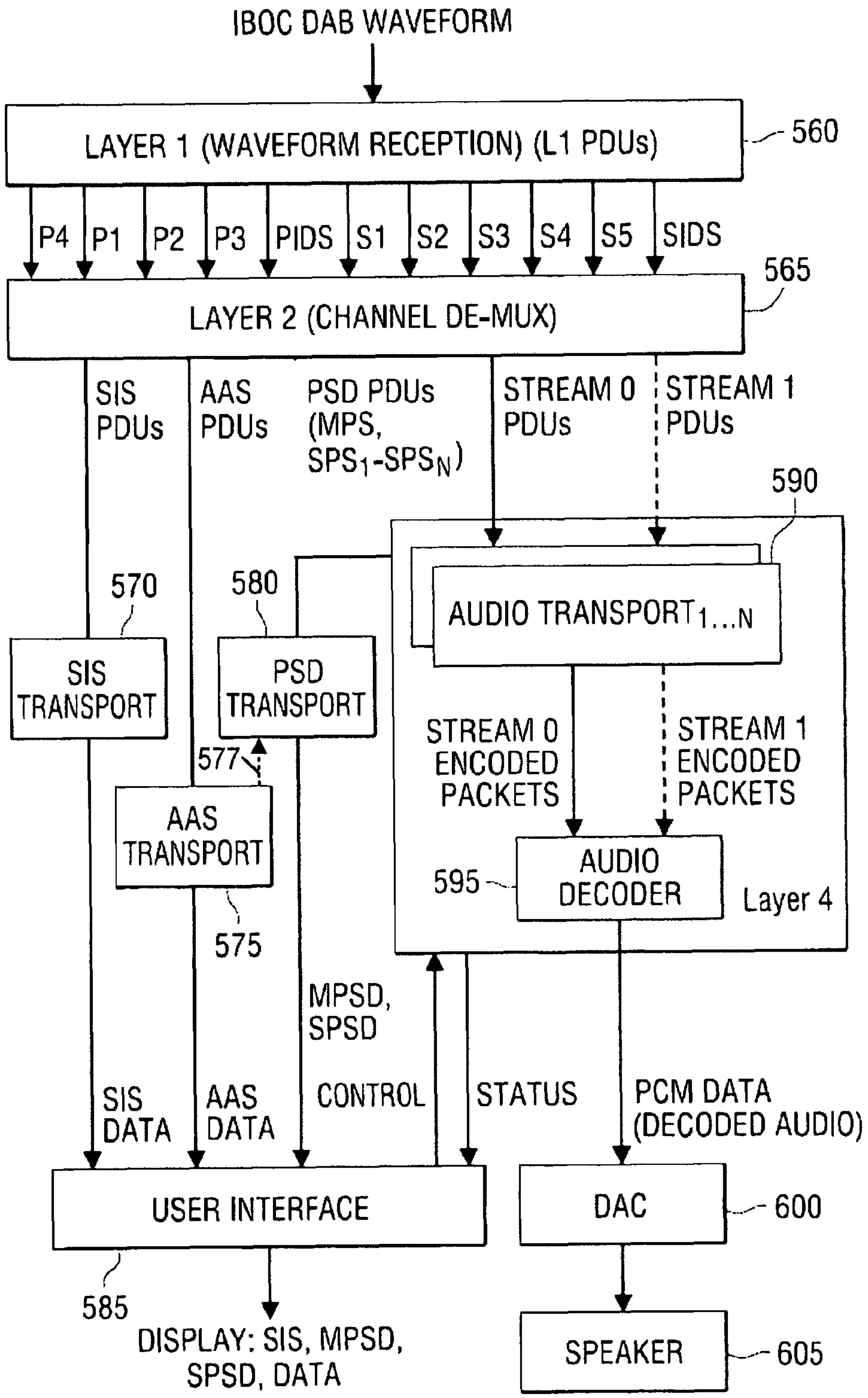
FIG. 10 is a diagram of an IBOC digital radio broadcasting logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P4, Primary IBOC Data Service Logical Channel (PIDS), S1-S5, and SIDS. Layer 1 produces L1 PDUs corresponding to the logical channels and sends the PDUs to Layer 2 (565), which demultiplexes the L1 PDUs to produce SIS PDUs, AAS PDUs, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). Encapsulated PSD data may also be included in AAS PDUs, thus processed by the AAS transport processor 575 and delivered on line 577 to PSD transport processor 580 for further processing and producing MPSD or SPSD. The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and information related to seek or scan for radio stations broadcasting an all-digital or hybrid IBOC signal. Layer 4 also provides status information to the user interface.

The following describes an exemplary process for advancing through a plurality of services in a digital radio broadcast receiver in accordance with certain embodiments. First, a general description of an exemplary process using a set of service identification entries will be provided. Then exemplary embodiments of various other types of sets of entries, seek/scan modes, and seek/scan sequences will be discussed. Finally, exemplary techniques of creating and updating the set of entries will be discussed. Note that in the following description, reference will be made simultaneously to components of both the exemplary AM IBOC receiver of FIG. 7 and the exemplary FM IBOC receiver of FIG. 8*a* since the operation of both is substantially similar for purposes of the present disclosure. Thus, for example, the host controller is referred to below as the host controller 240, 296.

Figure 11:
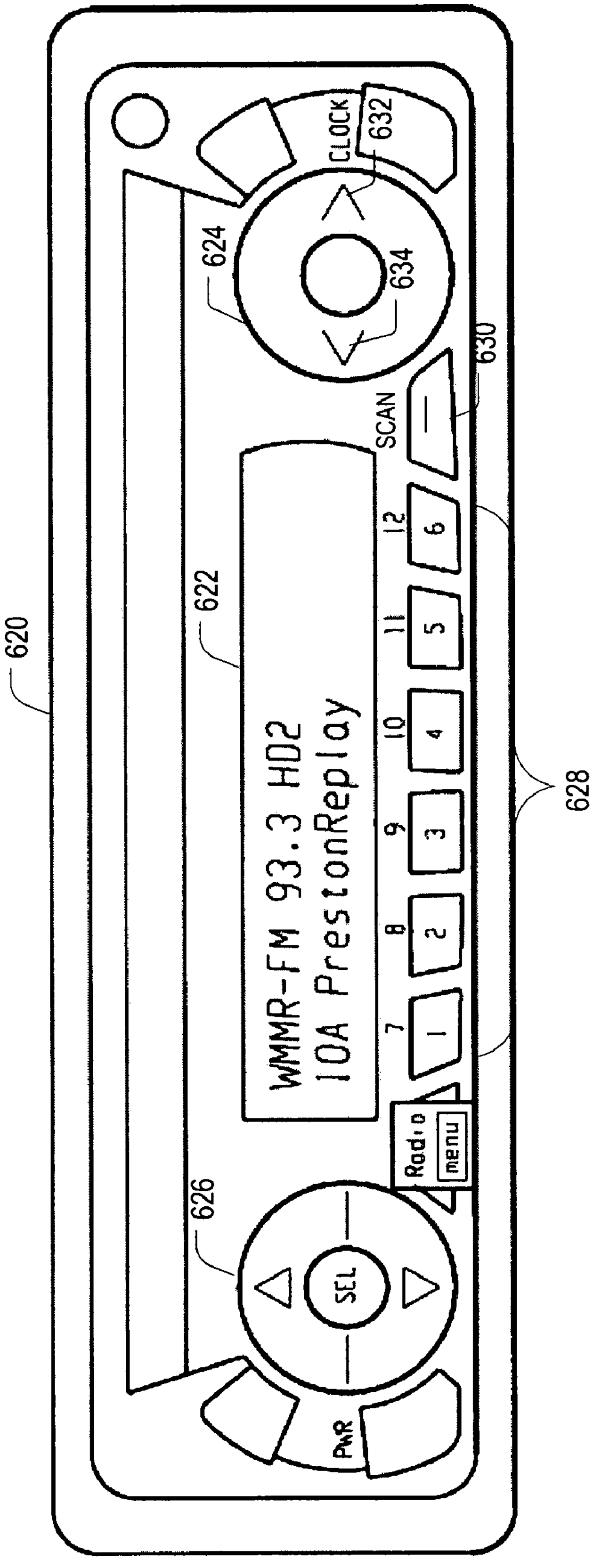
FIG. 11 illustrates a faceplate of an exemplary digital radio broadcast receiver in accordance with certain embodiments.

An exemplary digital radio broadcast receiver is illustrated in FIG. 11. This exemplary receiver 620 includes a display 622, such as a 2 line by 16 character LCD or LED, for example, and a number of user controls for, among other things, controlling the receiver's radio tuner 624, volume 626, user-defined presets 628, scanning 630, seek up 632, seek down 634, etc. The combination of the display 620, and user controls may be considered a man-machine interface that provides information to the user and that permits the user to control the receiver. While a relatively simple receiver has been used for illustrative purposes, different receivers can have different input, display, and memory capabilities. For example, some typical receiver's displays may include 4 line by 16 character LED or LCD displays, 256 color graphic displays, multi-line back lit LCD displays with 6" or larger multimedia displays, and portable radio back lit LCD displays. Generally the receivers with more advanced displays have more available memory. Simpler receivers may only have a small amount of RAM (e.g., less than 50 Kbytes) while more advanced receivers may have a larger amount of RAM (e.g., 100 Kbytes or more) as well as non-volatile memory such as Flash ROM (e.g., built-in Flash, a hard disk drive, and/or a SD® Memory Card). Voice recognition may also be provided in the receiver to facilitate user control using voice recognition functionality known in the art.

Figure 12:
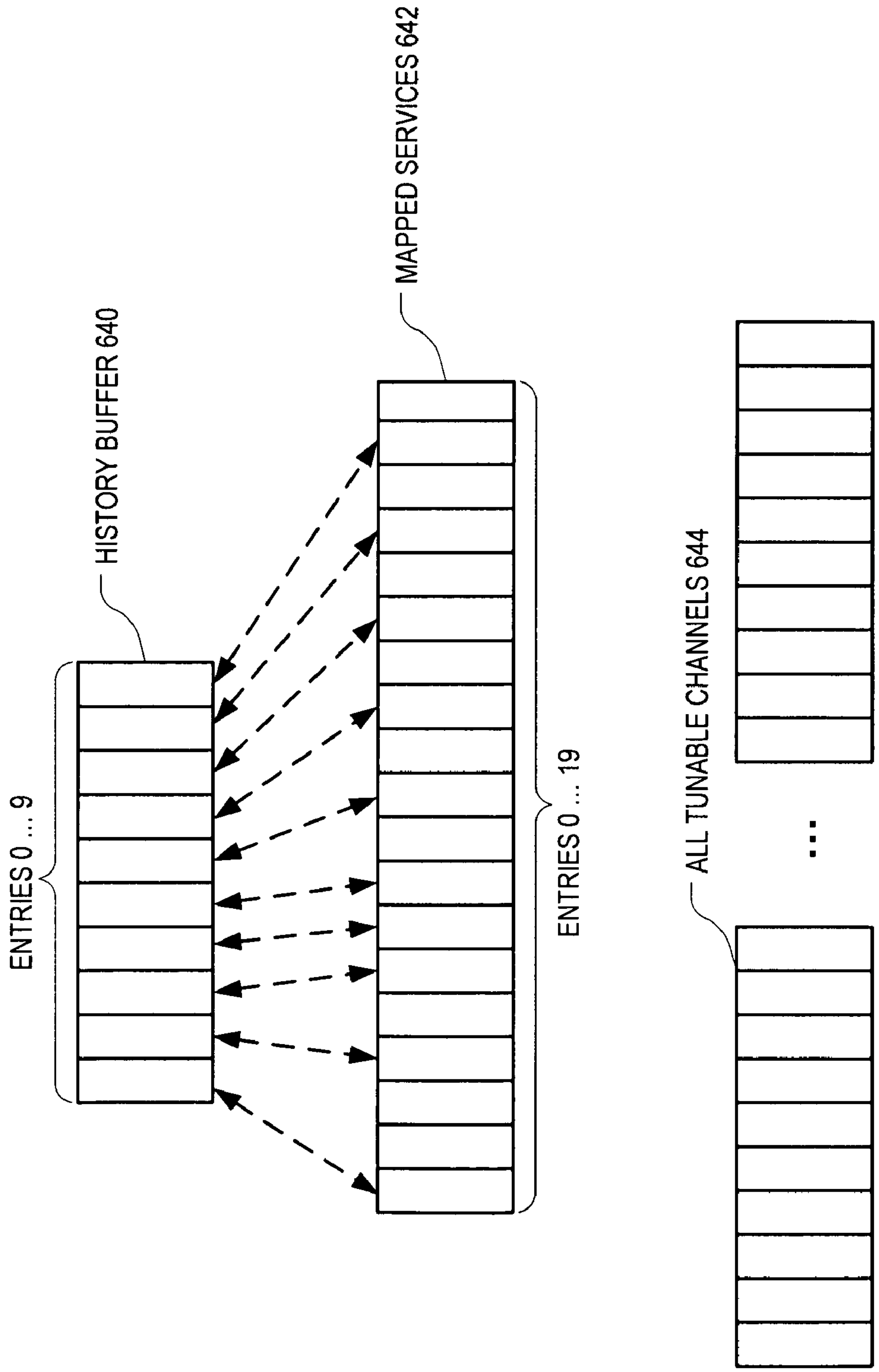
FIG. 12 illustrates sets of entries in accordance with certain embodiments.

FIG. 12 is an exemplary diagram illustrating service identification entries in accordance with certain embodiments. Each entry identifies a service and at least some of the services have been previously identified as receivable with sufficient signal strength or quality for reception as described below. For a description of using signal quality, reference is made to commonly owned U.S. application Ser. No. 11/757, 513, the disclosure of which is incorporated by reference. As illustrated, a first set of entries may be referred to as a history buffer 640. The history buffer 640 is shown for exemplary purposes as having 10 entries, although any suitable number could be used such as, for example 15 entries or 20 entries. The history buffer 640 includes entries identifying the services most recently selected by a user. For example, the history buffer 640 may include the 10 most recent stations tuned to by a user and time stamps as described below. The history buffer 640 is a subset of all of the mapped services 642, which comprises all of the services that the digital radio receiver has identified as receivable with sufficient signal strength or quality for reception. This is illustrated with dashed lines illustrating that entries in the history buffer 640 correspond with entries in the mapped services 642. While shown for exemplary purposes as including 20 entries, it should be apparent that the mapped services 642 may consist of any suitable number of entries. Finally, the mapped services 642 are a subset of all tunable channels 644, which may include 120 radio stations in the entire radio band in addition to supplemental services. The history buffer 640, mapped services 642, and all tunable channels 644 may each be considered a set of entries. In certain embodiments, only the history buffer 640 and the mapped services 642 are stored in memory. In other embodiments all tunable channels 644 may be stored in memory. Additionally, in certain embodiments the history buffer 640 and/or the mapped services 642 may be omitted.

The sets of entries can be stored in any suitable data structure. For example, a simple data array or table could be used. Alternatively, the files could be stored in a database such as SQLite or MySQL. Naturally, the data structure utilized should be consistent with the memory capabilities of the receiver. Thus more capable receivers could have more complex data structures. For ease of description, the data structure will be described in terms of a table, but it should be understood that the exemplary embodiments are not limited to a table, and any suitable data structure can be used.

Certain embodiments of the present disclosure can utilize these sets of entries to facilitate rapid seeking and scanning. For example, in certain embodiments, the digital radio broadcast receiver may be configured to seek or scan in three passes. On the first pass, the receiver traverses entries in the history buffer 640. On the second pass, the receiver traverses entries in the mapped services 642 that were not included in the first pass. And on the third pass, the receiver traverses all tunable channels 644 that were not included in the first and second pass. In this manner, the services most likely to be selected are rendered for the user first, thereby increasing the efficiency of the seek or scan. Such embodiments may reduce the seek and scan times by, for example, 80% over conventional digital radio broadcast receivers.

Figure 13:
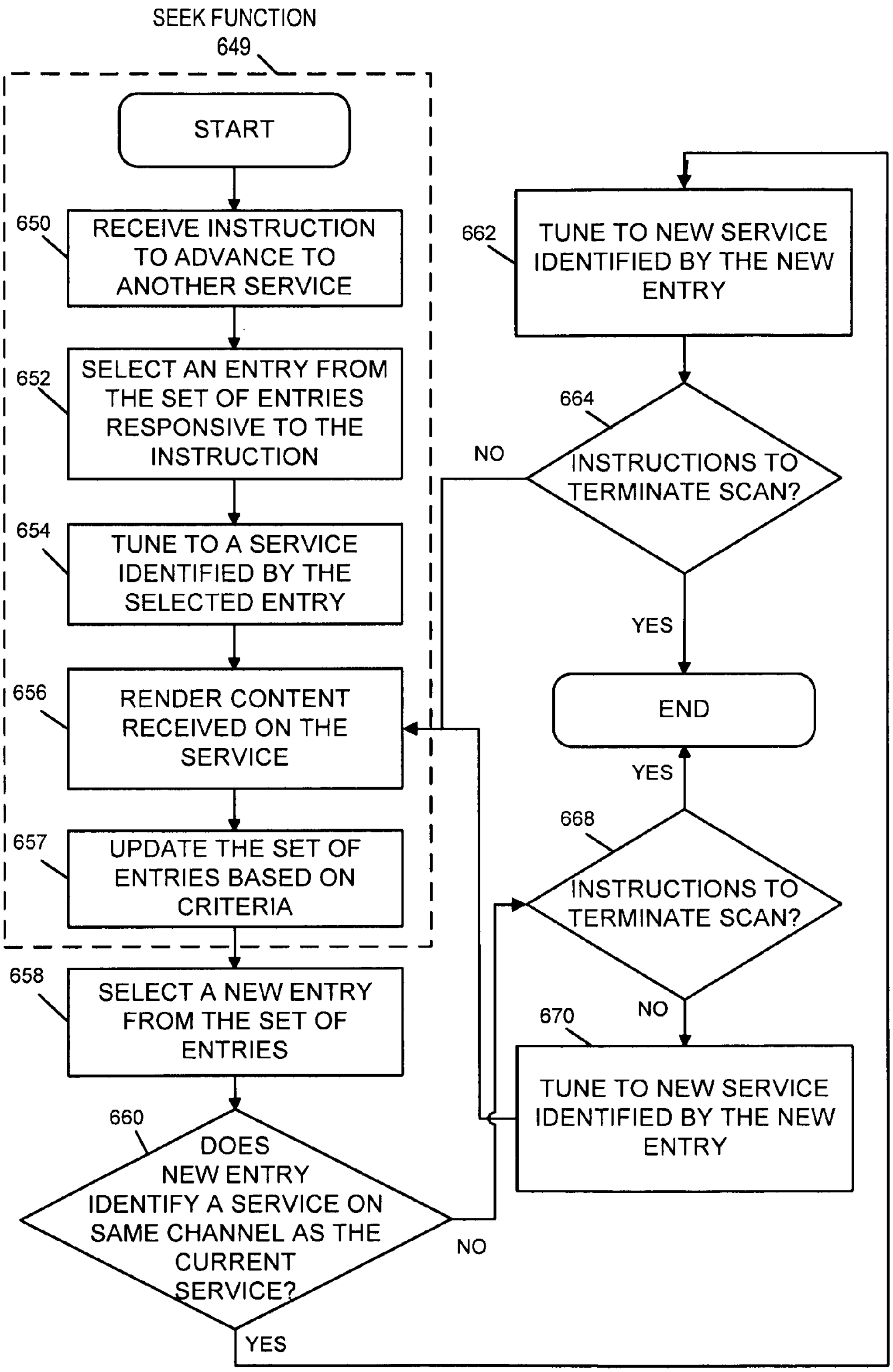
FIG. 13 illustrates an exemplary process of advancing through a plurality of services in a digital radio broadcast receiver in accordance with certain embodiments.

Referring to FIG. 13, a user inputs an instruction into the man-machine interface to advance to another service (e.g., initiate a seek or a scan for services). For example, the user could press the “SCAN” button 630, the seek up button 632, or the seek down button 634 on the exemplary receiver of FIG. 11. If a seek instruction has been entered, then the receiver performs a seek function 649 comprising steps 650 to 657. If a scan instruction has been entered, then the receiver perform the steps of the seek function 649 and additional relevant steps of FIG. 13. While the exemplary embodiments described herein refer to various processes as being performed in the host controller 240, 296, a skilled person would appreciate that this processing could be implemented in one or more other components. For example, processing could be performed in the data processor 232, 288, processor 224, 280, a separate baseband processor, or any suitable combination of these components.

Seeking and scanning are typically performed for each radio band (i.e., AM or FM) separately and do not cross from one band to the other. The radio band that is traversed is typically defined by the band that the digital radio broadcast receiver is currently tuned to at the time of the seek or scan request. However, the present inventors have observed that in certain circumstances, it may be desirable to seek or scan across radio bands, i.e., from AM to FM or from FM to AM. For example, if a user is seeking a local traffic data service or a talk radio show, the user will not typically care whether the service is received on the FM or AM radio band. Accordingly, in certain embodiments, a seek or scan operation may select an entry identifying a service on a radio band different from the radio band that the receiver is currently tuned to. For example, if the receiver is tuned to FM, a seek function may select an entry identifying a service broadcast on AM or if the receiver is tuned to AM, a seek function may select an entry identifying a service broadcast on FM.

In step 650, the host controller 240, 296 receives the instruction to advance to another service from the man-machine interface via the DCU 242, 298. The host controller 240, 296 then determines whether a set of service identification entries has been stored in memory, for example by querying the memory module 244, 300 or accessing an internal memory in the host controller. If not already stored, the receiver can populate the set of service identification entries in a variety of ways described below.

In certain embodiments, if there is no set of entries stored in memory or the set is empty, the host controller 240, 296 can direct the tuner 206, 256 to seek or scan for receivable signal and available services either increasing or decreasing from the current tuned service.

Next, if there is a set of entries stored in memory having at least one entry, then in step 652 the host controller 240, 296 selects an entry from the set of entries stored in memory of the receiver responsive to the instruction. As discussed above, each entry identifies a service, and at least some of the identified services correspond to services that were previously identified as receivable with sufficient signal strength or quality for reception. The selection will be based on current settings that instruct the host controller 240, 296 how to select the entry. The settings may be, for example, user selected, factory preset, or determined by the host controller 240, 296 based on various factors such as the current state of the receiver's user interface or other factors that would be appreciated by one of skill in the art. The settings will typically be stored in a memory such as a RAM, ROM or Flash. A variety of settings in accordance with exemplary embodiments are described below.

Once an entry is selected, in step 654 the host controller 240, 296 directs the tuner 206, 256 and front end 201, 251 to tune to the service identified by the selected entry. If there is currently no available signal on the selected service, then the host controller selects a new entry based on the current settings (i.e. goes back to step 652). Additionally, in preferred embodiments the host controller may delete an entry that corresponds to a service having no available signal if the host controller has failed to acquire any signal on that service after a certain number of attempts. For example, each entry may contain a field that contains the number of failed attempts to acquire signal on the associated service. Each time the host controller determines that no signal was acquired on the associated service, it will update this failed attempts field. Once this field reaches a predetermined number, the host controller deletes the associated entry. Any suitable number of failed attempts could be used such as, for example, two, three, four or five failed attempts.

In certain embodiments, the identified services correspond to analog radio frequencies. For example, if the selected entry identifies 90.9 FM, then the tuner would be set to that frequency and the FM signal received on that frequency is decoded. In other embodiments, the identified services correspond to digital radio subchannels (e.g., supplemental channels). For example, if the selected entry identifies 90.9-2 FM, then the tuner would be set to 90.9 FM and the digital signal on that subchannel would be decoded. However, the potential cost of tuning directly to supplemental channels is that it would typically incur additional delay while acquiring and decoding the digital signal. Combinations of these types of entries could also be implemented. For example, some entries could identify analog radio frequencies and others could identify digital radio subchannels, or alternatively a given entry might include both an analog radio frequency and one or more related digital radio subchannels on that frequency.

In step 656, the receiver renders the decoded content received on the service at the digital radio broadcast receiver. Decoded audio content could be reproduced on audio speakers by way of audio output on line 230, 286 and decoded data content can be rendered via the man-machine interface, for example on the display 622 of FIG. 11.

During a scanning operation, the receiver renders content for a predetermined amount of time, which is typically an amount of time suitable for the user to determine whether they desire to receive the content on the current service such as, for example, approximately 3 seconds. The user then listens to or views the content being rendered and decides whether they want to continue listening to or viewing the content. If the user wants to continue then they input a signal to terminate scanning into the man-machine interface (e.g., they press the "SCAN" button 630 again), and the scanning will stop.

In step 657, the host controller 240, 296 updates the set of entries stored in memory based on certain criteria. As discussed in more detail below, the update may include updating the time stamp of the entry corresponding to the current service (i.e., setting the time stamp to the current time), and/or recalculating likelihood values for each of the entries in the set of entries based on the selected entry and the user's previous listening behavior. An exemplary criteria may be a minimum dwell time, i.e., the receiver must render the selected service for at least a predetermined amount of time such as 30 seconds before the set of entries will be updated. Minimum dwell time criteria may be useful to prevent updating the entries for services that the user does not enjoy. Other criteria can include only updating certain entries (e.g., entries other than the selected entry) if the user's listening behavior is being tracked. This type of criteria may be advantageous if normalized likelihood values are stored for all entries that need to be recalculated to reflect the service currently being rendered as discussed below.

In a seek function 649, step 657 is the final step. However, in some instances a user may invoke the seek function 649 repeatedly to traverse through multiple or all the entries such as when the user is looking for a specific service. As discussed previously in connection with FIG. 12, the host controller 240, 296 may traverse the entries of a history buffer containing recently listened to or viewed entries first, then through a set of entries for all mapped services. In certain embodiments, the host controller 240, 296 may track the rapidly traversed entries, for example storing all entries that have been selected in the previous 5 or 10 minutes to determine when all of the entries have been exhausted. Once the stored entries are exhausted, the host controller 240, 296 may direct the tuner 206, 256 to find receivable signal and available content either increasing or decreasing in radio frequency from the current service, skipping over any services that were already traversed. Alternatively, the host controller 240, 296 could start over from the first entry. While described in terms of a repeated seek function, it should be readily apparent that this order could also apply to a scanning operation.

In a scanning operation, the host controller 240, 296 continues in step 658 to select a new entry from the set of entries stored in digital memory of the receiver responsive to the instruction. In step 660 the host controller determines whether the new entry is on the same radio channel as the current service. If so (e.g., the current service is 90.9-1 FM and the new entry corresponds to 90.9-2 FM), in step 662 the host controller 240, 296 directs the tuner 206, 256 and front end 201, 251 to tune to the service identified by the new entry. Then in step 664 the host controller 240, 296 determines whether an instruction to terminate scanning has been received from the man-machine interface during the predetermined time. If yes, then the scan is ended and the current service will continue to be rendered. If not, then the process returns to step 656 and the receiver renders the decoded content received on the service at the digital radio broadcast receiver for the predetermined time.

If in step 660 the host controller determines that the new entry is not on the same radio channel as the current service (e.g., the current service is 90.9-1 FM and the new entry corresponds to 107.7-1 FM), then in step 668 the host controller 240, 296 determines whether an instruction to terminate scanning has been received from the man-machine interface during the predetermined time. If yes, then the scan is ended and the current service will continue to be rendered. If not, then in step 670 the host controller 240, 296 directs the tuner 206, 256 and front end 201, 251 to acquire the service that corresponds to the service identifier of the new entry. Then the process returns to step 656 and the receiver renders the decoded content received on the service at the digital radio broadcast receiver for the predetermined time.

Although the exemplary process illustrated in FIG. 13 has been described as a linear process, this should not be considered to limit the disclosure or the claims and two or more steps may be performed concurrently. It may be desirable for the receiver to select and tune to the service of the next entry concurrently with rendering the content received on the current service. Advantageously, this type of concurrent approach could improve the user's experience by reducing the perceived waiting time to tune to new services. However, there may be cost implications since such embodiments would typically include at least two separately tunable components. While the example below is described in terms of a dual tuner configuration, it should be appreciated that three or more tuners could be used.

Figure 8B:
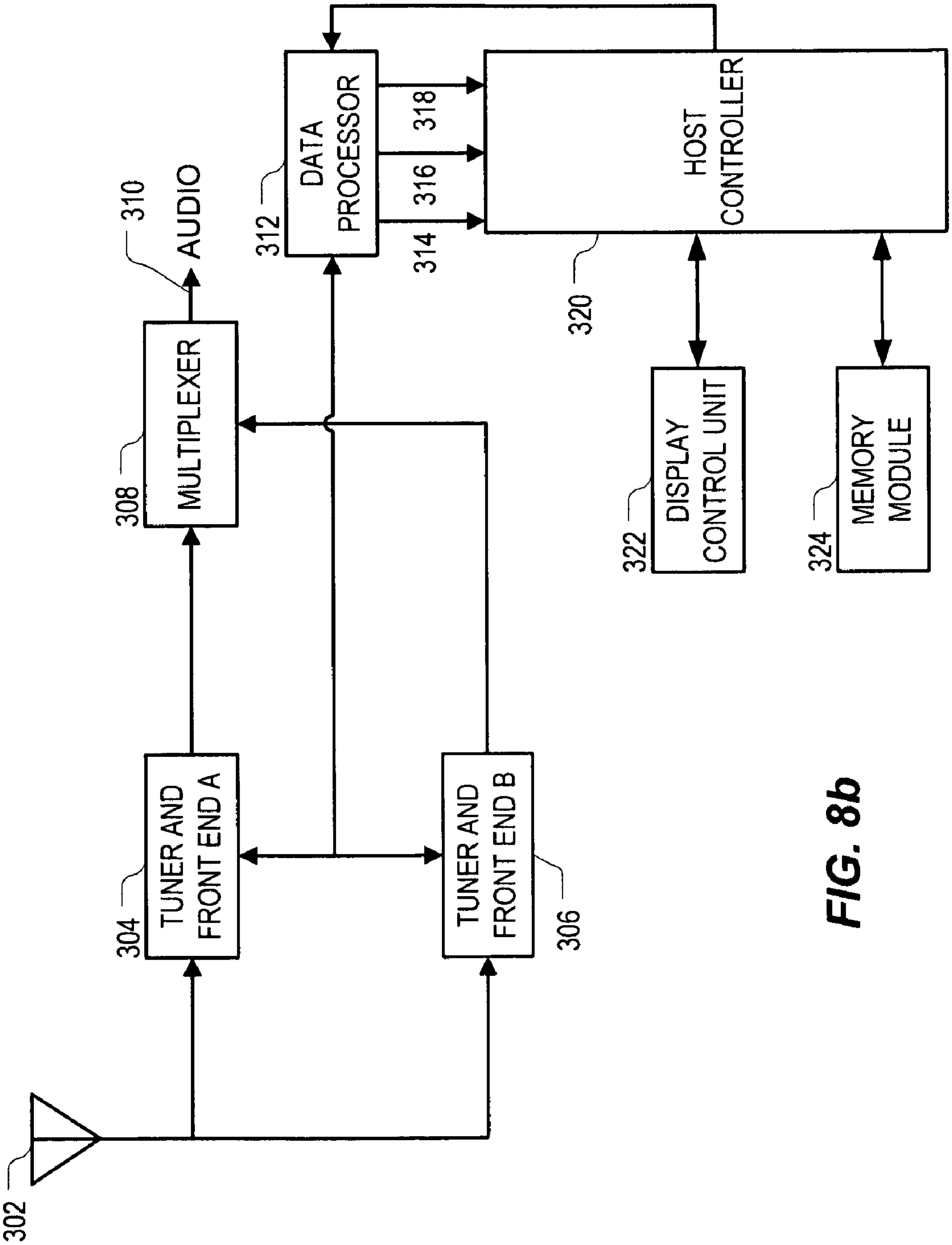
FIG. 8*b* is a functional block diagram of a dual tuner digital radio broadcasting receiver in accordance with certain embodiments.

In certain embodiments, while the user is listening to or viewing the rendered content, the host controller 240, 296 is concurrently directing the tuner front end 201, 251 to acquire the service that corresponds to the service identifier of the next entry even though the next entry corresponds to a radio frequency different than the radio frequency of the service currently being rendered. Such embodiments will typically require dual tuners but they may advantageously cut the seeking and scanning time of the receiver approximately in half. An exemplary dual-tuner digital radio broadcast receiver is illustrated in FIG. 8*b*. The exemplary receiver includes an antenna 302, two tuners and two front ends, tuner and front end A 304 and tuner and front end B 306 similar to the front ends 201, 251 described above. The tuner and front end may be any suitable combination of AM and FM tuners and front ends such as dual FM, dual AM, or one AM and one FM. It should be noted that, while only one antenna 302 is shown for exemplary purposes, two or more antennas could be employed in certain embodiments such as AM and FM combinations. The audio signal from both front ends is fed through a multiplexer 308 to produce an audio output on line 310. A data processor 312 processes the data signals and produces data output signals on lines 314, 316 and 318. The data lines 290, 292 and 294 may be multiplexed together onto a suitable bus such as an I2C, SPI, UART, or USB. The data signals can include, for example, SIS, MPS data, SPS data, and one or more AAS. The host controller 320, DCU 322, and memory module 324 are similar to the host controllers 240, 296, DCUs 242, 298, and memory modules 244, 300 previously described. Thus, with reference to FIG. 13, for example, while tuner and front end A 304 is rendering content such as at step 656, the host controller 320 can have already selected a new entry at step 658, evaluated the decision at step 660, and tuner and front end B 306 can have proceeded to acquire a subsequent service on a new frequency as illustrated in the figure. Similar embodiments could also allow one tuner to tune to an audio service while a second tuner is tuning to an AAS (e.g., traffic). In other words, a dual tuner configuration can simultaneously render and acquire new services to reduce the amount of time that might be incurred with acquiring a new service in a single tuner configuration.

It should be noted that the set of entries could have been generated and stored in the memory module 244, 300 or internal memory in several different ways. For example, in certain embodiments, the set of entries may be retrieved from a non-volatile memory such as the memory module 244, 300 upon initialization of the receiver. The set of entries may be stored separately in memory. Additionally, typical digital radio broadcast receivers support preset memory for 10 to 20 services. Accordingly, service identifiers for entries may be imported from one or more user defined presets. Each entry retrieved from memory will typically include a field for at least a service identifier. Additionally, each entry may include one or more additional fields that are discussed in more detail below. The fields in the set of entries may be encoded in any suitable manner such as for example, as text strings or integers.

In certain embodiments, the set of entries may be created upon initialization of the receiver (e.g., the first time the receiver is powered on by the user or each time the receiver is powered on). Upon receiver initialization the host controller 240, 296 creates a blank set of entries (e.g., reserves memory space or creates a pointer). Then the host controller directs the tuner to tune to each available service and check for receivable signal and available content. For each service having receivable signal and available content, the host controller creates an entry including at least a service identifier. The set of entries is then stored in memory, for example, in the memory module 244, 300. Each entry created will typically include at least a service identifier. Additionally, each entry may include one or more additional fields that are discussed in more detail below.

Figure 14:
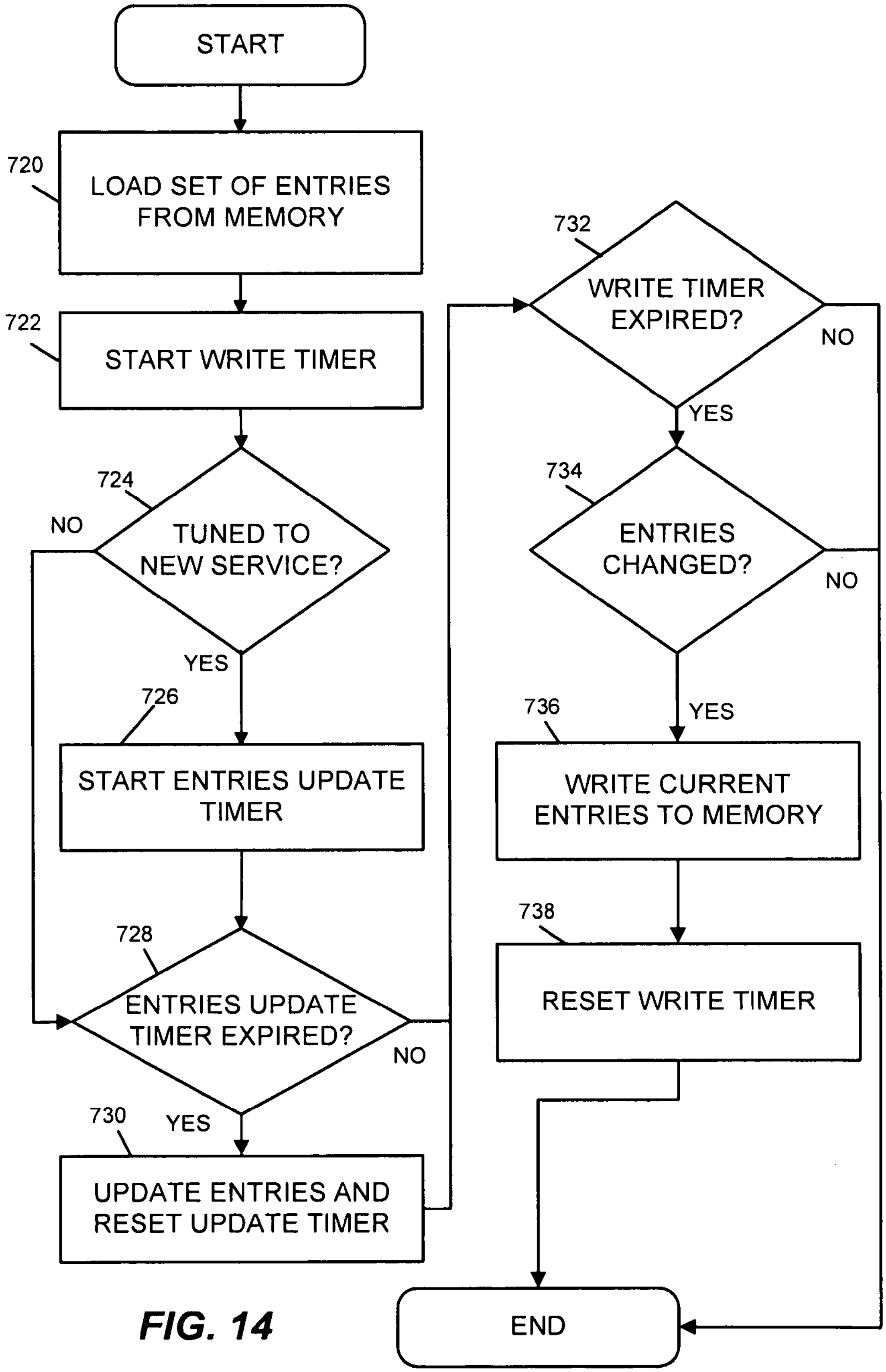
FIG. 14 illustrates an exemplary process for updating a set of entries of services in accordance with certain embodiments.

Preferably, the entries in the set of entries will be periodically updated. FIG. 14 illustrates an exemplary process for retrieving and updating the set of entries. This process may include updating entries stored in a history buffer and for all mapped services together or separately as desired. In step 720, the host controller 240, 296 loads the entries from a non-volatile memory (e.g., memory module 244, 300) into an operating memory (e.g., RAM onboard the host controller 240, 296). As part of this step, the host controller 240, 296 may validate or perform an error check on the retrieved table to determine whether any data has been corrupted. Step 720 could be performed, for example, upon initialization of the receiver or upon each function call to the table updating routine.

Next, in step 722 the host controller 240, 296 starts a write timer that controls when the entries currently stored in operating memory will be re-written to non-volatile memory. The duration of this write timer would be implementation specific and could be any suitable time period such as for example, every 10 minutes. This duration could be user configurable or could be a factory preset.

In step 724 the host controller 240, 296 determines whether the receiver has tuned to a new service. This could have been as a result of, for example, a seek function, a scanning operation, manual tuning of the receiver, or selection of a user defined preset. In step 726, if the service has been changed, then the host controller starts an entries update timer that controls when the entries currently stored in the operating memory will be updated to correspond to the new service. The duration of this timer would be implementation specific. In certain embodiments, this duration could be set so that it is sufficient to allow acquisition of the SIS and SIG data such as, for example, approximately 3 seconds. In other embodiments, this duration could be set so that it is sufficient to confirm that the user is interested in listening to or viewing the current service such as, for example, approximately 60 seconds. Additionally, after the entries update timer expires the first time, the duration may be set to a different interval that is longer or shorter than the initial duration (e.g., the initial duration is 3 seconds and thereafter the duration is 2 seconds or 4 seconds). The initial duration and the subsequent duration could both be user configurable, both be factory preset, or could be any combination thereof.

Next, in step 728 the host controller determines whether the entries update timer has expired. If so, in step 730 the host controller updates the entries in operating memory to reflect information regarding the current service and then resets the update timer. For example, the entries could be updated by adding a new entry that corresponds to the current service if no entry includes the current service. This new entry could include a service identifier and one or more other fields such as a time stamp that are discussed in more detail below. The entries could also be updated by updating the time stamp of the entry corresponding to the current service (i.e., setting the time stamp to the current time), and/or recalculating likelihood values for each of the entries in the set of entries based on the selected entry and the user's previous listening behavior.

In step 732, the host controller determines whether the write timer has expired. If so, then in step 734 the host controller determines whether the entries have been changed from the version stored in non-volatile memory. For example, this could be determined by comparing the contents of the entries stored in operating memory with the version stored in non-volatile memory. In certain embodiments, this could be performed by storing a version number with the set of entries, incrementing the version number each time the entries in operating memory has been changed, and comparing the version number of the entries stored in non-volatile memory with the version number of the entries stored in operating memory. Any other suitable method could be used as would be appreciated by one of ordinary skill in the art. If the entries have been changed, then in step 736 the host controller writes the entries from operating memory to the non-volatile memory and resets the write timer in step 738.

In certain embodiments it may be desirable to set a maximum number of entries, for example to conserve memory resources. The maximum number of entries may be different for a history buffer than for the mapped services. For a history buffer, this maximum number may be, for example, 10 to 20 entries and may match the number of potential user defined presets. For the mapped services, this maximum number may be 100, 200, or more. In certain embodiments, it may be desirable to delete old entries when new entries are added. This can be done, for example, by deleting the entry having the oldest time stamp when the entries have reached maximum capacity to make space for a new entry. Such deletion could be done for both radio bands jointly, potentially resulting in removing all AM or FM entries.

Exemplary embodiments may include a variety of entries, modes, and sequences. For example, the set of entries may include radio frequencies as the service identifiers as illustrated in Table 1 below. In typical embodiments, both AM and FM band service identifiers are contained in the same table although they may alternatively be stored separately.

TABLE 1

| # | Service Identifier |
|---|---|
| 1 | 90.9 FM |
| 2 | 107.7 FM |
| 3 | 1090 AM |
| 4 | 93.3 FM |

Exemplary embodiments can use a variety of modes to seek or scan through the entries. For example, the mode could cause the host controller 240, 296 to select the first entry that has a service identifier corresponding to a service higher in frequency than and proximate to the service currently being received. When the top of the frequency band is reached (e.g., 107.9 FM) the host controller wraps around to the bottom of the radio band (e.g., 87.5 FM). This type of mode is referred to herein as seek/scan up. For example, assume that the receiver is currently tuned to 100.3 FM. According to Table 1, the host controller would first select 107.7 FM, then 90.9 FM, and then 93.3 FM. Alternatively, the mode could cause the host controller 240, 296 to select the first entry that has a service identifier corresponding to a service lower in frequency than and proximate to the service currently being received. When the bottom of the frequency band is reached (e.g., 87.5 FM) the host controller wraps around to the top of the radio band (e.g., 107.9 FM). This type of mode is referred to herein as seek/scan down. According to this example using Table 1 above, the host controller 240, 296 would first select 93.3 FM, then 90.9 FM, and then 107.7 FM. Additionally, the mode could cause the host controller 240, 296 to randomly select an entry from the current radio band. This type of mode is referred to herein as a random mode.

Exemplary embodiments can also use a variety of sequences to traverse the set of entries during a repeated seek function or a scanning operation. The sequence could be part of the mode or could be separately established as a distinct factory or user determined input. For example, the host controller could tune to each frequency and render the main content (i.e. the analog and MPS signals) only. In a scanning operation, if the user fails to provide an input signal that would cause the receiver to stop scanning during the rendering of the main program, then the host controller will select the next frequency and render the main content from that frequency. This type of sequence is referred to herein as a non-multicast sequence.

Figure 15:
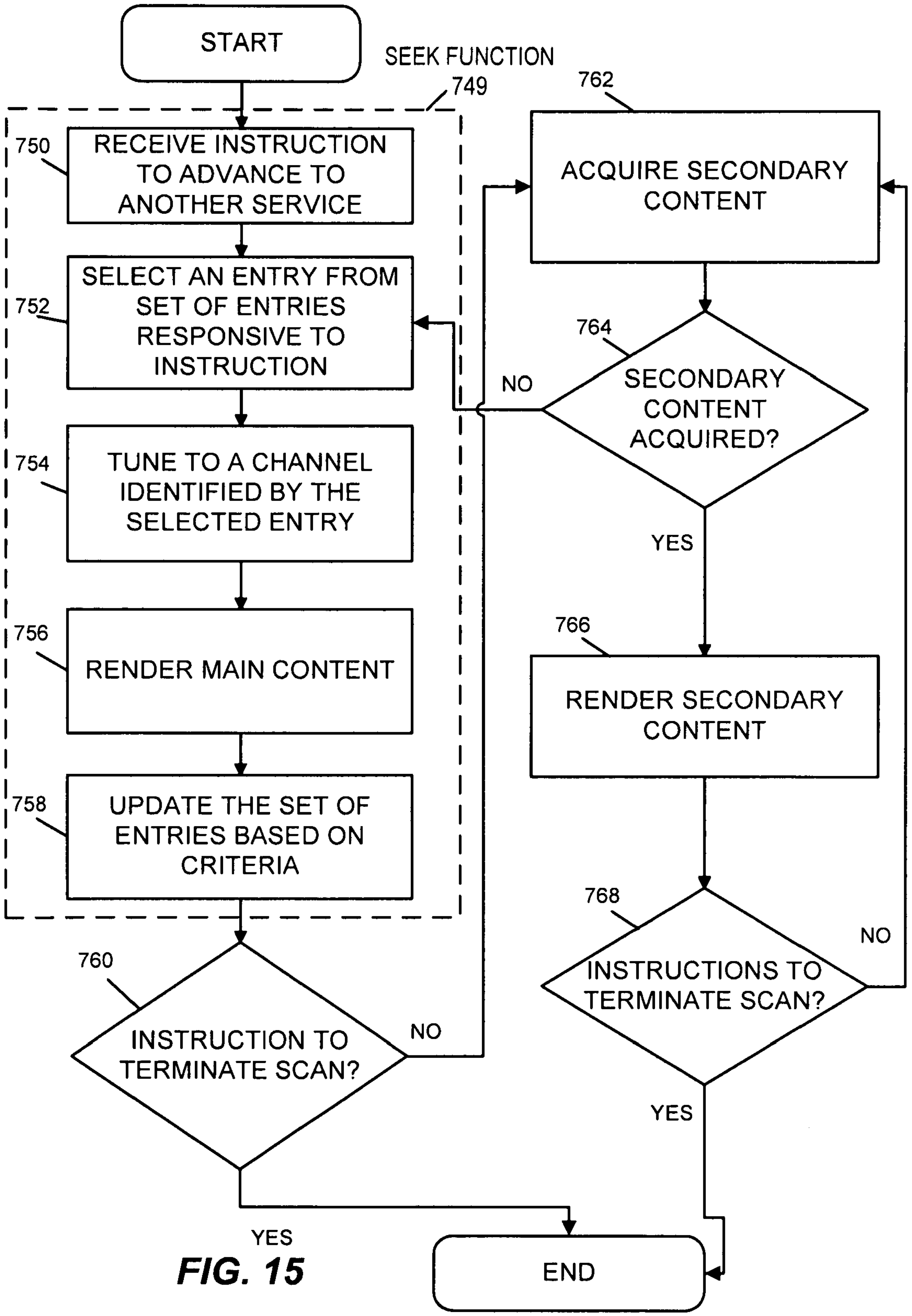
FIG. 15 illustrates an exemplary process of advancing through a plurality of services in a digital radio broadcast receiver in accordance with certain embodiments.

Alternatively, the receiver could render the secondary content on the current channel as well (i.e. the supplemental services). This type of sequence is referred to herein as a multicast sequence. An exemplary embodiment of multicast sequence is illustrated in FIG. 15. In step 750 the host controller 240, 296 receives an instruction from a man-machine interface to advance to another service as described above. This instruction may be a seek function 749 or a scanning operation. In this exemplary embodiment, each entry in the set of entries identifies a radio channel. In step 752, the host controller selects an entry from the set of entries responsive to the instruction. In step 754 the host controller directs the tuner 206, 256 to tune to the channel identified by the selected entry.

The receiver renders the main content (i.e. MPS) received on the identified channel in step 756. For a scanning operation, the content is rendered for a predetermined amount of time and the user listens to the content being rendered to decide whether they want to continue listening or not. In step 758, the host controller updates the set of entries based on certain criteria as discussed above in connection with step 657 of FIG. 13. For a seek function 749, this is the final step.

For a scanning operation, at step 760, the host controller 240, 296 determines whether an instruction to terminate the scan has been received from the man-machine interface during the predetermined time. For example, to stop scanning, the user can enter a terminate scanning instruction during a predetermined time period in step 758 by pressing the "SCAN" button 630 again. While the user is listening to or viewing the rendered content, the host controller 240, 296 is attempting to acquire any supplemental services (e.g., SPS or CAs) that may be present on the current channel in step 762. Preferably the predetermined time period is sufficient to acquire any supplemental services being broadcast on the current frequency (e.g., approximately 3 to 5 seconds although it may vary depending on the particular implementation). After the predetermined amount of time the host controller 240, 296 checks whether a supplemental service has been acquired in step 764. If so, then the receiver renders the secondary content in step 766 and checks for instructions to terminate the scan in step 768. If the user inputs a terminate scan instruction during the predetermined time period then scanning is stopped. Otherwise, the host controller continues to determine whether additional supplemental services have been acquired and steps 762 to 768 are repeated until each supplemental service has been rendered. Once each available supplemental service on the current channel has been rendered, the host controller 240, 296 selects the next entry from the set of entries in step 752 and the process continues through all the entries. Once content for each entry in the current radio band has been rendered, the host controller 240, 296 can direct the tuner 206, 256 to scan for receivable signals and available content sequentially in frequency either increasing or decreasing from the current frequency in a similar manner as conventional seeking and scanning techniques. Alternatively, the host controller could start over from the first entry.

In certain embodiments, the sequence could include only supplemental services such as SPSs and CAs. This type of sequence is referred to herein as a supplemental-only sequence.

In certain embodiments the set of entries may include radio frequencies as service identifiers and time stamps as illustrated in Table 2 below. While the exemplary time stamps in Table 2 are shown in Month, Day, Time format, any suitable time format may be used as would be appreciated by the skilled artisan.

TABLE 2

| # | Service Identifier | Time Stamp |
|---|---|---|
| 1 | 90.9 FM | Nov. 10, 2008 09:35 |
| 2 | 107.7 FM | Nov. 8, 2008 15:00 |
| 3 | 1090 AM | Nov. 9, 2008 12:07 |
| 4 | 93.3 FM | Nov. 10, 2008 04:54 |

Exemplary embodiments can use a variety of modes to traverse these entries. For example, the mode could be a seek/scan up, seek/scan down, or random as described above. Additionally, in certain embodiments the mode could cause the selection of the first entry having a time stamp closest to the current time and each successive selected entry would have the next closest time stamp. For example, using Table 2, if the current time is Nov. 10, 2008 14:03 then the first entry selected would be 90.9 FM, the next entry would be 93.3 FM, and the next would be 107.7 FM. Exemplary embodiments can also use a variety of sequences to traverse these entries. For example, multicast, non-multicast, or supplemental-only as described above could be used.

In certain embodiments the set of entries may include radio frequencies as service identifiers, time stamps, and likelihood values (e.g., probabilities) that a user would want to tune to the corresponding radio frequency as illustrated in Table 3 below. While the exemplary likelihood values in Table 3 are shown as normalized probabilities for each radio band, any suitable representation may be used as would be appreciated by the skilled artisan.

TABLE 3

| # | Service Identifier | Time Stamp | Probability Value | Desirability |
|---|---|---|---|---|
| 1 | 90.9 FM | Nov. 10, 2008 09:35 | 0.40 | 0.90 |
| 2 | 107.7 FM | Nov. 8, 2008 15:00 | 0.10 | 0.27 |
| 3 | 1090 AM | Nov. 9, 2008 12:07 | 0.95 | 2.00 |
| 4 | 93.3 FM | Nov. 10, 2008 04:54 | 0.50 | 0.83 |

The likelihood values can be obtained in a variety of ways. For example, probabilities could be determined by analyzing historic usage patterns of the user to determine the relative amounts of time spent listening to or viewing each service.

Certain embodiments may include user profiles that allow user specific customization of radio listening preferences. Each user profile may include a set of entries associated with a user. The user profiles may be stored in a memory of the digital radio broadcast receiver. The host controller 240, 296 could be configured to receive user identification via the man-machine interface at any suitable time, such as upon initialization or user request, and then load the associated user profile from memory. Any suitable technique of user identification could be used such as, for example, a menu selection, a PIN, an RFID code, or biometrics (e.g., fingerprint or retinal scan). Alternatively, a user profile could be stored in a removable memory device and automatically uploaded upon insertion of the device into the digital radio broadcast receiver. As an example, assume user A and user B both share an automobile that includes a digital radio broadcast receiver. While user A listens to 90.9-1 FM and 107.7-2 FM, user B only listens to 1090 AM. Thus the user profile for user A would include entries for 90.9-1 FM and 107.7-2 FM and the user profile for user B would include an entry for 1090 AM. In addition to entries for services, the user profiles may include various information such as, for example, preferred genres, transaction information, demographic information, psychographic information, geographic information, and listening behavior information for its associated user.

The entries associated with a user profile may be updated as described above with reference to FIG. 14. In addition to updating the entries, various other information associated with a user profile may be updated as well. For example, if a user selects a service genre not previously associated with the user's profile, then this new genre could be added to the user profile.

In certain embodiments, the entries associated with user profiles may be portable between various digital radio broadcast receivers. For example, the host controller could download the entries associated with a user profile to a removable memory device such as an SD Card or a USB drive. These entries could be stored on the removable memory device using any suitable data structure such as, for example, an XML file or a comma separated value (CSV) file. After a user downloads the desired entries to the removable memory device, the removable memory device could be inserted into another digital radio broadcast receiver and the entries could then be uploaded. Advantageously, this could allow a user to maintain their user profile across various devices. For example, a user may enjoy listening to the radio in their automobile and at the office. By allowing portability of the user's profile, each digital radio broadcast receiver could be customized and the user's profile would be constantly updated with the user's current listening preferences.

Exemplary embodiments can use a variety of modes to traverse these entries. For example, the mode could be a seek/scan up, seek/scan down, or random as described above. Additionally, the probability value may be used alone or in conjunction with the time stamp to determine which entries will be selected. For example, the time stamp and the probability could each be weighted to give an overall desirability for a given entry, which could be used to determine the order of seeking or scanning. For example, the time stamp and probability could both be weighted equally. The time stamp weighting could consist of ranking the time stamps of the entries based on how recently each was listened to (e.g., in Table 3 above, 90.9 FM could be assigned 4.0, 93.3 FM would be 3.0, etc.) and then normalizing the result so that it is comparable to the probability value. For example, using Table 3 above and assuming that the current radio band is FM and there are only the three FM entries shown, 90.9 FM would have a normalized value of $3/(3+2+1)=0.50$. Then each entry would be given an overall desirability by adding the time stamp weighting to the probability value. Thus the mode would cause the selection of the first entry having the highest desirability (e.g., 90.9 FM) and each successive selected entry would have a successively lower desirability (e.g., 93.3 FM, and then 107.7 FM). Alternatively, the mode could cause the selection of the first entry having the highest probability and each successive selected entry would have a successively lower probability. For example, using Table 3, if the current time is November 10, 14:03 then the first entry selected would be 93.3 FM, the next entry would be 90.9 FM, and the next would be 107.7 FM. Exemplary embodiments can also use a variety of sequences to traverse these entries. For example, multicast, non-multicast, or supplemental-only as described above could be used.

In certain embodiments the set of entries may include radio frequencies as service identifiers and service genres as illustrated in Table 4 below. While the exemplary service genres in Table 4 are shown as textual descriptors, any suitable representation may be used as would be appreciated by the skilled artisan such as, for example, enumerated data types.

TABLE 4

| # | Service Identifier | Genre |
|---|---|---|
| 1 | 90.9 FM | Classical |
| 2 | 107.7 FM | Jazz |
| 3 | 1090 AM | Classical |
| 4 | 93.3 FM | Country |

The service genres may be included as part of the PSD. Accordingly, upon acquisition of the digital signal, the host controller 240, 296 retrieves available genre information and stores it for the MPS audio and/or SPS audio along with the corresponding radio frequency.

Exemplary embodiments can use a variety of modes to traverse these entries. The possible modes in such embodiments could include a user desired genre mode that would be input via the DCU 242, 298 prior to initiating the seek or scan. Additionally, the mode could be a seek/scan up, seek/scan down, or random as described above, wherein the only entries selected are those matching the user's selected genre. Exemplary embodiments can also use a variety of sequences to traverse these entries. For example, multicast, non-multicast, or supplemental-only as described above could be used.

Numerous variations of the above-described exemplary embodiments are possible. For example, the set of entries may include a combination of several different field types and may indicate what services are available on a given channel as shown in Table 5 below. Advantageously, such embodiments could provide the capability to traverse based on a variety of different modes such as user desired genre or closest time stamp.

TABLE 5

| # | Channel | Services | Time Stamp | Genre |
|---|---|---|---|---|
| 1 | 88.9 FM | Analog; MPS; SPS 1 | Feb 20, 2008 10:20 | Jazz; Talk |
| 2 | 90.9 FM | Analog; MPS; SPS 1 | Feb 27, 2008 14:30 | Rock; Talk |
| 3 | 100.3 FM | Analog; MPS; SPS 1; SPS 2 | Mar 2, 2008 04:12 | R&B; Classic; Sports |

Additionally, in certain embodiments the set of entries may include separate entries for each service such as shown in Table 6 below. In this example, 88.9-1 FM identifies a talk format broadcast on SPS 1 of 88.9 FM, 90.9 identifies a rock & roll format broadcast in analog and/or on the MPS of 90.9 FM, and 100.3-2 FM identifies a rhythm & blues format broadcast on SPS 2 of 100.3 FM. Advantageously, such embodiments could allow seeking or scanning directly to desired supplemental services without having to first render the main program content.

| # | Service Identifier | Time Stamp | Genre |
|---|---|---|---|
| 1 | 88.9-1 FM | Feb 20, 2008 10:20 | Talk |
| 2 | 90.9 FM | Feb 27, 2008 14:30 | Rock |
| 3 | 100.3-2 FM | Mar 2, 2008 04:12 | R&B |

The previously described exemplary embodiments of the present disclosure have many advantages, including:

One advantage is that in certain embodiments the amount of time required to seek to a new service and scan available services is reduced. For example, in certain embodiments the seek and scan times may be reduced by 80% over conventional digital radio broadcast receivers.

Another advantage is that in certain embodiments, services that are unlikely to have desirable content are skipped during the seek or scan process.

Yet another advantage is that in certain embodiments, the seek or scan process includes services that are limited to specific user selected genres, thereby increasing the likelihood that a listener will quickly reach a desired service.

Still another advantage is that in certain embodiments, tracking of a user's historical preferences results in a high likelihood of rapidly tuning to a desired service.

Yet another advantage is that in certain embodiments, a digital radio broadcast receiver may seek or scan across radio bands to locate a desired service, thereby increasing the likelihood of locating the desired service.

The exemplary approaches described may be carried out using any suitable combinations of software, firmware and hardware and are not limited to any particular combinations of such. Computer program instructions for implementing the exemplary approaches described herein may be embodied on a computer-readable medium, such as a magnetic disk or other magnetic memory, an optical disk (e.g., DVD) or other optical memory, RAM, ROM, or any other suitable memory such as Flash memory, memory cards, etc. Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method of advancing to a service from a plurality of services in a digital radio broadcast receiver, the method comprising the steps of:

a. receiving an instruction to advance to another service from a man-machine interface of the digital radio broadcast receiver;

b. selecting an entry from a set of entries stored in a memory of the digital radio broadcast receiver responsive to the instruction, wherein each entry identifies a service, and wherein at least some of said services correspond to services identified by the receiver as receivable;

c. tuning to a first service identified by the selected entry;

d. rendering content received on the first service at the digital radio broadcast receiver; and e. when content received on the first service is rendered for a period of time exceeding a predetermined minimum dwell time, updating the set of entries stored in the memory of the digital radio broadcast receiver based on at least one criteria.

2. The method of claim 1 comprising the steps of:

a. selecting a new entry from the set of entries responsive to the instruction;

b. if a second service corresponding to the new entry is on the same frequency as the first service, i. tuning to the second service;

ii. determining whether an instruction to terminate scanning has been received from the man-machine interface during the predetermined time;

iii. if no instruction to terminate scanning was received during the predetermined time, rendering content received on the second service; and c. if the second service is not on the same frequency as the first service, i. determining whether an instruction to terminate scanning has been received from the man-machine interface during the predetermined time;

ii. tuning to the second service;

iii. if no instruction to terminate scanning was received during the predetermined time, rendering content received on the second service.

3. The method of claim 1 wherein each entry in the set of entries is associated with at least one user profile, and wherein selecting the entry comprises selecting an entry associated with a current user's profile.

4. The method of claim 1 comprising generating the set of entries by consecutively tuning to each frequency of a radio band and identifying receivable services.

5. The method of claim 1 comprising generating the set of entries by assigning user-defined station presets for storage as services identified as receivable.

6. The method of claim 1 wherein each entry further includes a time stamp, wherein selecting the entry comprises selecting an entry having the closest time stamp to a current time, and wherein updating the set of entries based on at least one criteria comprises updating the time stamp of the selected entry based on the current time.

7. The method of claim 1 wherein each entry further includes a service genre, and wherein selecting the entry comprises selecting an entry from a selected genre.

8. The method of claim 1 wherein each entry further includes a likelihood value based upon a user's previous listening behavior, wherein selecting the entry comprises selecting the entry based on the likelihood value, and wherein updating the set of entries based on at least one criteria comprises updating the likelihood value of at least one of the entries in the set of entries based on the selected entry and the user's previous listening behavior.

9. The method of claim 1 wherein tuning to the service is performed concurrently with rendering the content received on the service.

10. The method of claim 1 wherein updating the set of entries based on at least one criteria comprises:

a. acquiring at least one available service;

b. adding a new entry to the set of entries for each of the at least one available services that is not represented in the set of entries; and c. updating an existing entry in the set of entries for each of the at least one available services that is represented in the set of entries.

11. The method of claim 1 wherein the selected entry identifies a service on a radio band different from a radio band that the digital radio broadcast receiver is currently tuned to.

12. An article of manufacture comprising a non-transitory computer readable storage medium having computer program instructions adapted to cause a processing system to execute steps comprising:

a. receiving an instruction to advance to another service from a man-machine interface of a digital radio broadcast receiver;

b. selecting an entry from a set of entries stored in a memory of the digital radio broadcast receiver responsive to the instruction, wherein each entry identifies a service, and wherein at least some of said services correspond to services identified by the receiver as receivable;

c. tuning to a first service identified by the selected entry;

d. rendering content received on the first service at the digital radio broadcast receiver; and e. when content received on the first service is rendered for a period of time exceeding a predetermined minimum dwell time, updating the set of entries stored in the memory of the digital radio broadcast receiver based on at least one criteria.

13. The article of manufacture of claim 12 comprising the steps of:

a. selecting a new entry from the set of entries responsive to the instruction;

b. if a second service corresponding to the new entry is on the same frequency as the first service, i. tuning to the second service;

ii. determining whether an instruction to terminate scanning has been received from the man-machine interface during the predetermined time;

iii. if no instruction to terminate scanning was received during the predetermined time, rendering content received on the second service; and c. if the second service is not on the same frequency as the first service, i. determining whether an instruction to terminate scanning has been received from the man-machine interface during the predetermined time;

ii. tuning to the second service;

iii. if no instruction to terminate scanning was received during the predetermined time, rendering content received on the second service.

14. The article of manufacture of claim 12 wherein each entry in the set of entries is associated with at least one user profile, and wherein selecting the entry comprises selecting an entry associated with a current user's profile.

15. The article of manufacture of claim 12 comprising generating the set of entries by consecutively tuning to each frequency of a radio band and identifying services as receivable.

16. The article of manufacture of claim 12 comprising generating the set of entries by assigning user-defined station presets for storage as services identified as receivable.

17. The article of manufacture of claim 12 wherein each entry further includes a time stamp, wherein selecting the entry comprises selecting an entry having the closest time stamp to a current time, and wherein updating the set of entries based on at least one criteria comprises updating the time stamp of the selected entry based on the current time.

18. The article of manufacture of claim 12 wherein each entry further includes a service genre, and wherein selecting the entry comprises selecting an entry from a selected genre.

19. The article of manufacture of claim 12 wherein each entry further includes a likelihood value based upon a user's previous listening behavior, wherein selecting the entry comprises selecting the entry based on the likelihood value, and wherein updating the set of entries based on at least one criteria comprises updating the likelihood value of at least one of the entries in the set of entries based on the selected entry and the user's previous listening behavior.

20. The article of manufacture of claim 12 wherein tuning to the service is performed concurrently with rendering the content received on the service.

21. The article of manufacture of claim 12 wherein updating the set of entries based on at least one criteria comprises:

a. acquiring at least one available service;

b. adding a new entry to the set of entries for each of the at least one available services that is not represented in the set of entries; and c. updating an existing entry in the set of entries for each of the at least one available services that is represented in the set of entries.

22. The article of manufacture of claim 12 wherein the selected entry identifies a service on a radio band different from a radio band that the digital radio broadcast receiver is currently tuned to.

23. A digital radio broadcast receiver system configured to scan a plurality of services comprising:

a. a processing system; and b. a memory coupled to the processing system, wherein the processing system is configured to execute steps comprising:

i. receiving an instruction to advance to another service from a man-machine interface of the digital radio broadcast receiver;

ii. selecting an entry from a set of entries stored in a memory of the digital radio broadcast receiver responsive to the instruction, wherein each entry identifies a service, and wherein at least some of said services correspond to services identified by the receiver as receivable;

iii. tuning to a first service identified by the selected entry;

iv. rendering content received on the first service at the digital radio broadcast receiver; and v. when content received on the first service is rendered for a period of time exceeding a predetermined minimum dwell time, updating the set of entries stored in the memory of the digital radio broadcast receiver based on at least one criteria.

24. The digital radio broadcast receiver system of claim 23 comprising the steps of:

a. selecting a new entry from the set of entries responsive to the instruction;

b. if a second service corresponding to the new entry is on the same frequency as the first service, i. tuning to the second service;

ii. determining whether an instruction to terminate scanning has been received from the man-machine interface during the predetermined time;

iii. if no instruction to terminate scanning was received during the predetermined time, rendering content received on the second service; and c. if the second service is not on the same frequency as the first service, i. determining whether an instruction to terminate scanning has been received from the man-machine interface during the predetermined time;

ii. tuning to the second service;

iii. if no instruction to terminate scanning was received during the predetermined time, rendering content received on the second service.

25. The digital radio broadcast receiver system of claim 23 wherein each entry in the set of entries is associated with at least one user profile, and wherein selecting the entry comprises selecting an entry associated with a current user's profile.

26. The digital radio broadcast receiver system of claim 23 comprising generating the set of entries by consecutively tuning to each frequency of a radio band and identifying services as receivable.

27. The digital radio broadcast receiver system of claim 23 comprising generating the set of entries by assigning user-defined station presets for storage as services identified as receivable.

28. The digital radio broadcast receiver system of claim 23 wherein each entry further includes a time stamp, wherein selecting the entry comprises selecting an entry having the closest time stamp to a current time, and wherein updating the set of entries based on at least one criteria comprises updating the time stamp of the selected entry based on the current time.

29. The digital radio broadcast receiver system of claim 23 wherein each entry further includes a service genre, and wherein selecting the entry comprises selecting an entry from a selected genre.

30. The digital radio broadcast receiver system of claim 23 wherein each entry further includes a likelihood value based upon a user's previous listening behavior, wherein selecting the entry comprises selecting the entry based on the likelihood value, and wherein updating the set of entries based on at least one criteria comprises updating the likelihood value of at least one of the entries in the set of entries based on the selected entry and the user's previous listening behavior.

31. The digital radio broadcast receiver system of claim 23 wherein tuning to the service is performed concurrently with rendering the content received on the service.

32. The digital radio broadcast receiver system of claim 23 wherein updating the set of entries based on at least one criteria comprises:

a. acquiring at least one available service;

b. adding a new entry to the set of entries for each of the at least one available services that is not represented in the set of entries; and c. updating an existing entry in the set of entries for each of the at least one available services that is represented in the set of entries.

33. The digital radio broadcast receiver system of claim 23 wherein the selected entry identifies a service on a radio band different from a radio band that the digital radio broadcast receiver is currently tuned to.

* * * * *